United States Patent [19]
Hefner, Jr.

[11] Patent Number: 5,362,822
[45] Date of Patent: Nov. 8, 1994

[54] MESOGENIC ADDUCTS

[75] Inventor: Robert E. Hefner, Jr., Lake Jackson, Tex.

[73] Assignee: The Dow Chemical Company, Midland, Mich.

[21] Appl. No.: 176,619

[22] Filed: Jan. 3, 1994

Related U.S. Application Data

[63] Continuation-in-part of Ser. No. 1,368, Jan. 7, 1993, abandoned, which is a continuation-in-part of Ser. No. 562,772, Aug. 3, 1990, Pat. No. 5,189,117.

[51] Int. Cl.$^5$ ............... C08G 59/16; C08G 59/14; C07C 43/196; C07C 43/23
[52] U.S. Cl. ............... 525/523; 525/533; 528/101; 528/104; 528/105; 528/106; 528/109; 528/112; 528/119; 560/59; 560/60; 560/102; 564/305; 564/309; 564/325; 568/640; 568/641; 568/643; 568/644; 568/39
[58] Field of Search ............... 528/104, 101, 105, 106, 528/109, 112, 119; 525/523, 533; 560/59, 60, 102; 568/640, 641, 643, 644, 39; 564/305, 309, 325

[56] References Cited

U.S. PATENT DOCUMENTS

| | | |
|---|---|---|
| 2,181,085 | 11/1939 | Alquist et al. . |
| 2,712,001 | 6/1955 | Greelee . |
| 3,004,951 | 10/1961 | Dazzi . |
| 3,133,033 | 5/1964 | St. Clair et al. . |
| 3,291,775 | 12/1966 | Holm . |
| 3,374,203 | 3/1968 | Schmukler . |
| 3,378,525 | 4/1968 | Sellers . |
| 3,386,953 | 6/1968 | Danniag . |
| 3,477,990 | 6/1969 | Fogg . |
| 3,484,408 | 12/1969 | Holm . |
| 3,547,881 | 12/1970 | Mueller et al. . |
| 3,774,305 | 11/1973 | Stoffey et al. . |
| 3,784,516 | 1/1974 | Baxter et al. . |
| 3,907,768 | 9/1975 | van der Veen et al. . |
| 3,919,317 | 11/1975 | Huff et al. . |
| 4,027,950 | 6/1977 | Moriyama et al. . |
| 4,045,408 | 8/1977 | Griffith et al. . |
| 4,072,656 | 2/1978 | Hartmann . |
| 4,153,621 | 5/1979 | Hartmann . |
| 4,309,532 | 1/1982 | Cuscurida et al. . |
| 4,316,991 | 2/1992 | Speranza et al. . |
| 4,323,658 | 4/1982 | Speranza et al. . |

(List continued on next page.)

FOREIGN PATENT DOCUMENTS

| | | |
|---|---|---|
| 252358A | 1/1988 | European Pat. Off. . |
| 0260963 | 3/1988 | European Pat. Off. . |
| 0274128 | 7/1988 | European Pat. Off. . |
| 0282963 | 9/1988 | European Pat. Off. . |
| 0379055 | 7/1990 | European Pat. Off. . |
| 0379057 | 7/1990 | European Pat. Off. . |
| 0361853 | 9/1990 | European Pat. Off. . |
| 3628141 | 2/1988 | Germany . |
| 4217660 | 9/1967 | Japan . |
| 56-152830 | 11/1981 | Japan . |
| 58-206579 | 12/1983 | Japan . |
| 62-96484 | 5/1987 | Japan . |
| 63-10617 | 1/1988 | Japan . |

OTHER PUBLICATIONS

Derwent 84-014278/03.

(List continued on next page.)

*Primary Examiner*—John C. Bleutge
*Assistant Examiner*—D. R. Wilson

[57] ABSTRACT

An adduct is prepared by reacting (A) a compound containing at least one epoxy group per molecule, with (B) a compound containing at least one epoxide reactive group per molecule selected from the group consisting of phenolic, thiol, secondary amine and carboxyl; wherein (i) when compound (A) is a polyepoxide, compound (B) contains a single epoxide reactive group per molecule; (ii) when compound (A) is a monoepoxide it is a monoglycidyl ether and compound (B) contains at least two epoxide reactive groups per molecule; and (iii) at least one of components (A) and (B) contains a rod-like mesogenic moiety. These adducts are useful in the preparation of polyurethanes.

4 Claims, No Drawings

Page 2

U.S. PATENT DOCUMENTS

| | | |
|---|---|---|
| 4,349,619 | 9/1982 | Kamoshida et al. . |
| 4,480,082 | 10/1984 | McLean et al. . |
| 4,499,255 | 2/1985 | Wang et al. . |
| 4,518,720 | 5/1985 | Cuscurida et al. . |
| 4,594,291 | 6/1986 | Bertram et al. . |
| 4,594,373 | 6/1986 | Kohli . |
| 4,595,761 | 6/1986 | Chattha . |
| 4,609,719 | 9/1986 | Chattha . |
| 4,611,046 | 9/1986 | Chattha . |
| 4,611,047 | 9/1986 | Chattha . |
| 4,636,535 | 1/1987 | Wang et al. . |
| 4,645,803 | 2/1987 | Kohli et al. . |
| 4,663,401 | 5/1987 | Saito et al. . |
| 4,701,475 | 10/1987 | Turner . |
| 4,717,674 | 1/1988 | Sung . |
| 4,745,135 | 5/1988 | Thomas et al. ............ 525/130 |
| 4,745,136 | 5/1988 | Thomas et al. . |
| 4,745,137 | 5/1988 | Thomas et al. . |
| 4,758,636 | 7/1988 | Hijikata et al. . |
| 4,762,901 | 8/1988 | Dhein et al. ............ 528/77 |
| 4,791,154 | 12/1988 | Corley et al. . |
| 4,798,849 | 1/1989 | Thomas et al. . |
| 4,962,163 | 10/1990 | Hefner, Jr. et al. ........ 525/531 |

OTHER PUBLICATIONS

Derwent 88-007989/2.
Derwent 88-051279/08.
Derwent 89-087175/12.
CA 70(1):3447g.
CA 83(9):73391b.
CA 83(19):163806v.
CA 86(7):43569k.
CA 87(17):134456h.
CA 92(9):76098h.
CA 96(15):122404n.
CA 97(2):6812r.
CA 107:154822j.
CA 108:104042e.
CA 108:104102z.
CA 108:113482a.
Derwent 88-008358/02.
CA 109:23463m.
CA 109:38835h.
CA 109:94641d.
CA 109(14):111808Q.
CA 111:78671z.
CA 111:135362a.
CA 112:28469q.
CA 112:56856g.
CA 112:56860d.
CA 112:56861e.
CA 112:99377u.
CA 112:129691m.
CA 112:218080d.
CA 113:24809y.
CA 113:24810s.
CA 113:78995z.
CA 113:115909x.
CA 114:7539p.

Barron et al., "Synthesis and Antiinflammatory Activity of 4-(p-biphenylyl)-3-hydroxybuytric acid and Related Compounds", pp. 1139–1144; *J. Med. Chem.*, 11(6) (1968).

"Liquid Crystalline Elastomers—A New Type of Liquid Crystalline Material"; *Makromol. Chem.*, Rapid Commun., 2, pp. 317–322.

Iimura et al., "Liquid Crystalline Nature of Copolyurethanes", *Polymer Physics in Japan*, vol. XXV (1982), pp. 295–296.

Iimura et al., "Synthesis Thermotropic Liquid Crystalline Polymers, 2a Polyurethanes", *Makromol. Chem.*, 182, pp. 2569–2575 (1981).

Morman, et al., "4,4'diisocyanatoazobenzene A Mesogen for Liquid Crystalline", Polymer Bulletin, 24, pp. 413–419 (1990).

Schleier et al., "Chiral Polymers with Mesogenic Groups: Synthesis and Polymerization of Glycidyl Ethers", Conv. Ital. Sci. Macromol, 5th, pp. 239–342.

Slade, et al., "Inhibition of the Enzymic Hydration of the Epoxide Heom[1,2,3,4,5,9-hexachloro-6,7-epoxy-1,4,4a,5,6,7,8,8a-octahydro-1,4-methanonoaphthalene] in Insects", Pestic. Biochem. Physiol., 5(1), pp. 35–46.

Smyth et al., "Development of Crystalling in a Polyurethane Containing Mesogenic Units", *Macromolecules*, vol. 23, No. 14, pp. 3390–3397.

Tanaka et al., "Liquid Crystallinity of Polyurethane Containing Biphenyl Units", *Kobunshi Ronbunshu*, vol. 43, No. 5, pp. 311–314 (May 1986).

Advances in Polymer Science 59, Liquid Crystal Polymers I, Flory et al., "Molecular Theory of Liquid Crystals", pp. 1–36 (1984).

Advances in Polymer Science 59, Liquid Crystal Polymers I, Uematsu, et al., "Polypeptide Liquid Crystals", pp. 37–74, (1984).

(List continued on next page.)

OTHER PUBLICATIONS

Advances in Polymer Science 59, Liquid Crystal Polymers I, Papkov, et al., "Liquid Crystalline Order in Solutions of Rigid-Chain Polymers", pp. 75-102 (1984).
Advances in Polymer Science 59, Liquid Crystal Polymers I, Ober, et al., "Liquid Crystal Polymers with Flexible Spacers in the Main Chain", pp. 103-146 (1984).
Chattha et al., *J. Appl. Polym. Sci.*, 1987(33)5, pp. 1829-1834.
Dobas et al., *Zeitschrift fur polymerforschung*, 28, 11/12, pp. 589-594 (1977).
Eichler et al., *Die Angewandte Makromolekulare Chemie*, vol. 19, No. 239, pp. 31-55 (1971).
Panda, "Photocrosslinkable Resins with Benzylidene-acetophenone (Chalcone) Structure in the Repeat Unit", *J. Pol. Sci.*, vol. 13, pp. 1757-1764 (1975).
Sadafule et al., "Note a Photocrosslinkable Vinyl Polyester", *J. Mac. Sci.-Chem.*, A25(1), pp. 121-126 (1988).
CA 95:116389z.
CA 101:192592t.
CA 101:24301d.
CA 104:6259d.
CA 106:52298e.
Derwent 59720a/33.
Varma et al., *Indian Journal of Technology*, vol. 21, pp. 265-267 (Jul. 1983).
Zahir, "Studies in the Photodimerization of the Diglycidyl Ether of 4,4'-Dihydroxychalcone", *J. Appl. Pol. Sci.*, vol. 23, pp. 1355-1372 (1979).
CA 60:5407g.
CA 90:138566d.
CA 92:59604c.
CA 95:97564j.
Derwent 61196w/37.
Derwent 84-004219/01.
Derwent 85-173653/29.
Derwent 90978y/51.

MESOGENIC ADDUCTS

CROSS-REFERENCE TO RELATED APPLICATIONS

This application is a continuation-in-part of application Ser. No. 08/001,368 filed Jan. 7, 1993, abandoned, which is a continuation-in-part of application Ser. No. 07/562,772 filed Aug. 3, 1990 (now U.S. Pat. No. 5,189,117 issued Feb. 23, 1993), all of which are incorporated herein by reference in their entirety.

BACKGROUND OF THE INVENTION

The present invention relates to polyurethanes showing improved physical properties. In particular, it relates to polyurethanes in which physical properties are enhanced by molecular reinforcement.

Polyurethanes are a highly versatile class of plastics which find use in a broad range of applications. The properties of various polyurethanes in many cases determines, and often limits, these applications. Thus, much research is directed toward improving the properties of different types of polyurethanes in order to better meet the needs of a specific end use. In particular, improvements in flexural strength/modulus, tensile strength, tear strength and moisture resistance are highly sought by those in the field.

One method of obtaining improvement in certain of the mechanical properties has been disclosed by Turner in U.S. Pat. No. 4,701,475. That patent discloses polyurethanes containing dispersed particles of high melting, rigid, rodlike polymer capable of increasing tensile strength and/or elongation and, in some instances, tensile modulus. Thomas et al., in U.S. Pat. No. 4,745,137, discloses a solution or dispersion of a polymer prepared from an ethylenically unsaturated polyaromatic compound which contains a rigid moiety comprising at least two aromatic nuclei which are connected by a rigid connecting group, in a compound having at least two isocyanate-reactive groups per molecule. U.S. Pat. No. 4,745,136 extends the scope of that invention to include solutions or dispersions of polymers prepared from ethylenically unsaturated steroid derivatives. Polyurethane slabstock foam prepared using the polymer solutions or dispersions exhibited improved indentation load deflection, modulus and tensile elongation. U.S. Pat. No. 4,745,135 discloses polyurethanes prepared from polyols containing one or more rodlike mesogenic moieties as a part of the backbone or as pendant groups. Exemplary are the hydroxyl-terminated aromatic polyesters and the mesogen initiated polyethers such as alkylene oxide derivatives of cellulose or a rigid 4,4'-bisphenol.

Tanaka et al. (*Polymer Preprints*, Japan, 33(7) 1647-50 (1984)) discloses reaction of di(p-oxymethylphenyl)-terephthalate or of a bis(azomethine)diol, prepared via reaction of 1 mole of terephthaldehyde and 2 moles of p-aminophenethyl alcohol, with various diisocyanates to provide liquid crystalline polyurethanes. Tanaka and Nakaya (*Kohunshi Ronbunshu*, 43(5) 311-314 (May 1986)) disclose reaction of 4,4'-di(2-hydroxyethyloxy)-biphenyl with various diisocyanates to provide liquid crystalline polyurethanes. Iimura et ai. (*Makromol. Chem.* 182, 2569-75 (1981)) and Japanese Patent Application No. 55-56968 disclose reaction of 3,3-dimethyl-4,4'-diisocyanatobiphenyl with various alkanediols to provide liquid crystalline polyurethanes. The reaction of 3,3'-dimethyl-4,4'-diisocyanatobiphenyl with di-, tri- or tetraethylene glycol was shown to produce non-mesomorphic (amorphous) polyurethanes.

One particular problem encountered in the polyurethanes discussed above, in which relatively substantial levels of rodlike mesogenic moieties are present in the main chain of the polyurethane, is that they possess relatively high melt ($T_m$) and isotropization ($T_i$) temperatures. These values exceed typical polyurethane processing temperatures and, in some cases, are even above the decomposition temperature of the urethane linkages. Thus, they represent impractical formulation variations.

Thus, it would be desirable in the art to prepare polyurethane compositions from formulations which are easily processed and which do not tend to decompose at processing temperatures. Furthermore, it would be desirable to prepare polyurethane compositions exhibiting one or more enhanced mechanical properties such as flexural strength/modulus, tensile strength or tear strength; or improved moisture resistance from such formulations.

SUMMARY OF THE INVENTION

Accordingly, the present invention provides novel polyurethane compositions prepared by reacting (1) an epoxy resin adduct and (2) a polyisocyanate, at least one of which contains a rodlike mesogenic moiety. The formulation optionally further comprises one or more additional isocyanate-reactive compounds.

The present invention further provides novel epoxy resin adducts prepared by reacting an epoxide with an epoxide-reactive compound, at least one of which contains a rodlike mesogenic moiety.

Another aspect of the present invention is directed to an adduct prepared by reacting (A) a compound containing at least one epoxy group per molecule, with (B) a compound containing at least one epoxide reactive group per molecule selected from the group consisting of phenolic, thiol, secondary amine and carboxyl;

wherein (i) when compound (A) is a polyepoxide, compound (B) contains a single epoxide reactive group per molecule;

(ii) when compound (A) is a monoepoxide it is a monoglycidyl ether and compound (B) contains at least two epoxide reactive groups per molecule;

(iii) at least one of components (A) and (B) contains a rodlike mesogenic moiety; and (iv) components (A) and (B) are employed in amounts which provide an equivalent ratio of epoxide groups to epoxide-reactive groups of from about 1:80 to about 1:1.25;

with the proviso that (i) said adduct is not an adduct of the diglycidyl ether of 3,3',5,5'-tetramethylbiphenyl and phenol;

(ii) when component (B) contains a carboxyl group as the single epoxide reactive group per molecule and the other portion of the molecule is an aliphatic group, it is a saturated aliphatic group; and (iii) component (B) is not a compound containing a single epoxide-reactive group represented by the formula M¹-Q wherein M¹ is an aliphatic or cycloaliphatic group and Q is —OH.

The present invention provides polyurethane compositions having improved mechanical properties, notably tear strength, tensile strength, flexural strength/modulus and moisture resistance. Because of the relatively low melting points of many of the rodlike mesogenic moiety containing epoxy resin adducts, standard polyurethane processing conditions and temperatures can be readily used, thus avoiding decomposition of the polyurethane products.

Preferably, the present invention is not an adduct of the diglycidyl ether of 3,3',5,5'-tetramethylbiphenyl and phenol.

DESCRIPTION OF THE PREFERRED EMBODIMENTS

According to one embodiment of the present invention, an epoxy resin adduct having at least one rodlike mesogenic moiety is employed. This adduct can be effectively prepared by reacting an epoxide with an epoxide-reactive compound, at least one of which contains a rodlike mesogenic moiety. The epoxide can be either a polyepoxide or a monoepoxide. In the case of a polyepoxide, the other compound contains on the average per molecule a single epoxide-reactive group, and at least one of the reactants contains a rodlike mesogenic moiety. In the case of a monoepoxide, the other compound preferably contains on the average per molecule at least two epoxide-reactive groups, and at least one of the reactants contains a rodlike mesogenic moiety.

Selections of the generalized starting materials to produce the epoxy resin adducts useful in the present invention determines the location of the rodlike mesogenic moieties in the final adduct. Rodlike mesogenic side chain, or "pendant", moieties result from reaction of a rodlike mesogenic monoepoxide with a mesogen-free epoxide-reactive compound. Rodlike mesogenic side chains also result from the reaction of a mesogen-free polyepoxide with a rodlike mesogenic epoxide-reactive compound. Conversely, rodlike mesogenic moieties are present exclusively in the main chain of adducts prepared by reacting a mesogen-free monoepoxide with a rodlike mesogenic epoxide-reactive compound, or a rodlike mesogenic polyepoxide with a mesogen-free epoxide-reactive compound. Finally, when both the epoxide and the epoxide-reactive compound contain rodlike mesogenic moieties, the resulting adduct contains rodlike mesogenic moieties both in the main chain and in side chains.

Suitable polyepoxides which can be employed herein include particularly any epoxy-containing compound which contains an average of more than one vicinal epoxide group per molecule. The epoxide groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, aromatic or cycloaliphatic hydrocarbon group which hydrocarbon group can be substituted with any inert substituent including, but not limited to, halogen atoms, preferably chlorine or bromine, nitro groups and the like or such groups can be attached to the terminal carbon atoms of a compound containing an average of more than one —(O—CHR$^a$—CHR$^a$)—$_t$ group where each R$^a$ is independently hydrogen or an alkyl or haloalkyl group, containing from 1 to about 2 carbon atoms, with the proviso that only one R$^a$ group can be a haloalkyl group, and t has a value from 1 to about 100, preferably from 1 to about 20, more preferably from 1 to about 10, most preferably from 1 to about 5.

The polyepoxides suitable in certain embodiments of the present invention for preparing the adducts preferably contain an average of two or more 1,2-epoxide groups per molecule. As already noted, the polyepoxides can be either free of rodlike mesogenic moieties or contain rodlike mesogenic moieties, depending upon the selection of the epoxide-reactive compound. Some examples of typical polyepoxides are represented by the following formulas:

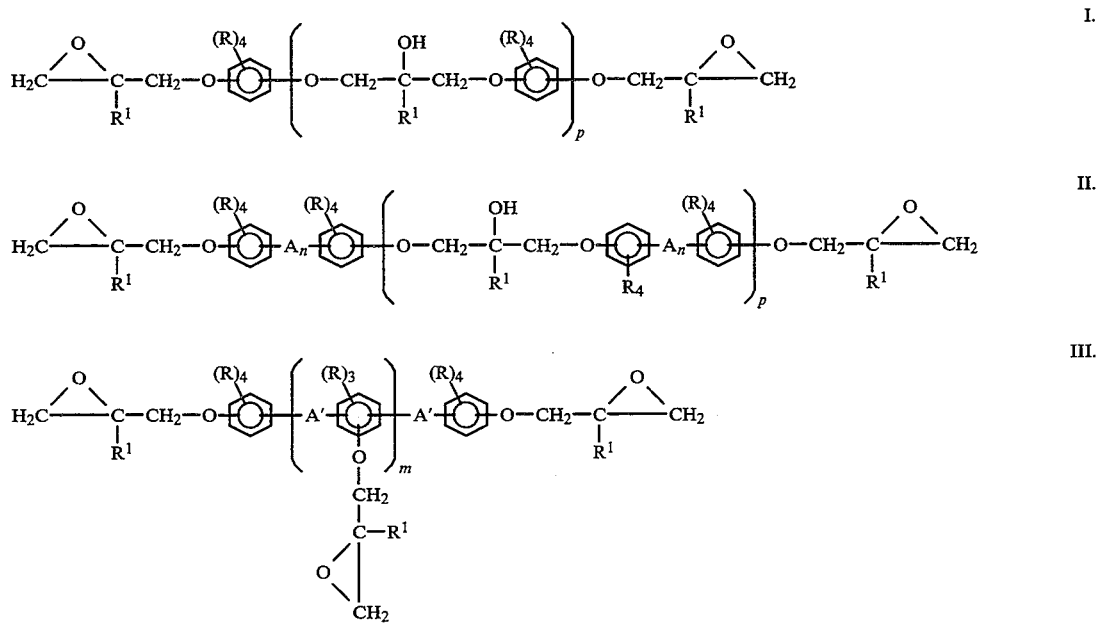

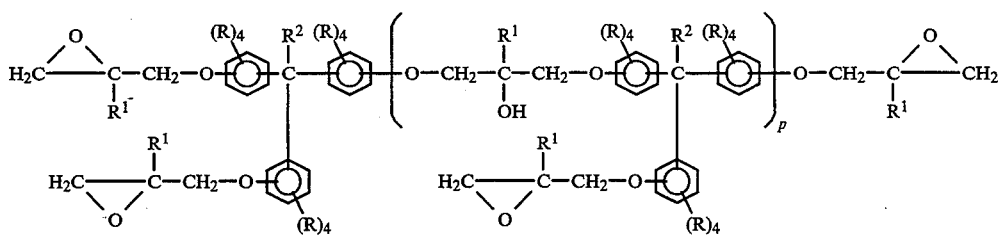

IV.

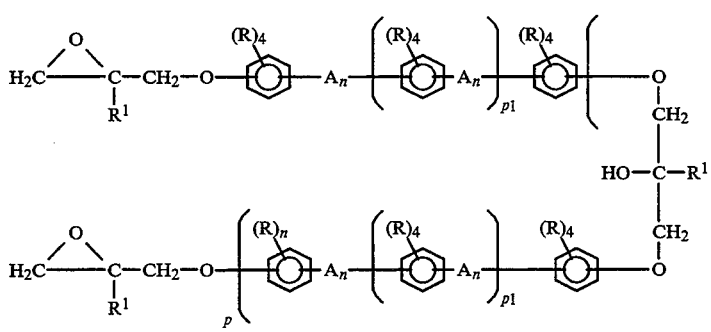

V.

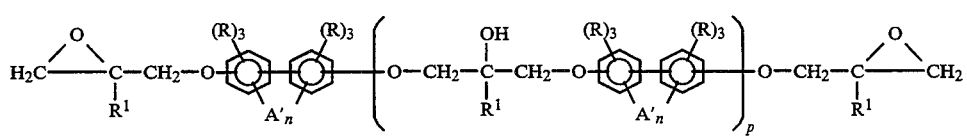

VI.

wherein each A is independently a divalent hydrocarbyl group having from 1 to about 20, preferably from 1 to about 14, carbon atoms, a direct single bond, —O—, —CO—, —SO—, —SO$_2$—, —S—, —S—S—, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$—, —CR$^1$=N—O—OC—, —CO—NR$^1$—NR$^1$—OC—, —CR$^1$=CR$^1$—O—OC—, —CO—O—CR$^1$=CR$^1$—, —O—OC—CR$^1$=CR$^1$—, —CR$^1$=CR$^1$—CO—O—, —CHR$^1$—O—CO—CR$^1$=CR$^1$—, —CR$^1$=CR$^1$—CO—O—CHR$^1$—, —CHR$^1$—CO—O—CR$^1$=CR$^1$—, —CR$^1$=CR$^1$—O—CO—CHR$^1$—, —CO—S—, —S—OC—, —CH$_2$—CH$^2$—CO—O—, —O—O—C—CH$_2$—CH$_2$—, —C≡C—C≡C—, —CR$^1$=CR$^1$—CR$^1$=CR$^1$—,

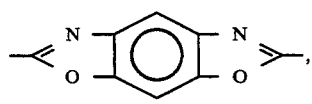

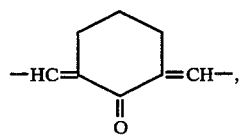

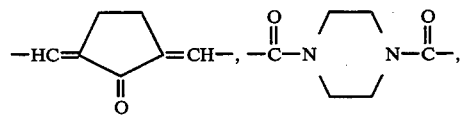

-continued

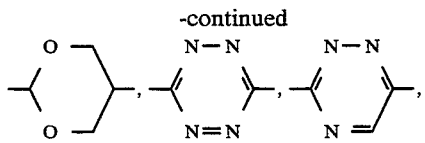

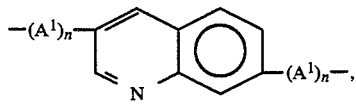

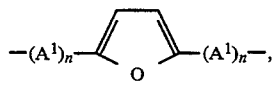

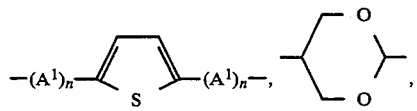

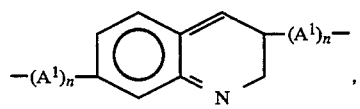

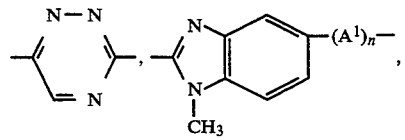

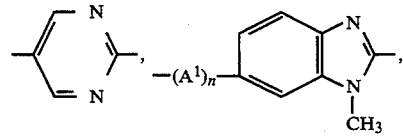

-continued

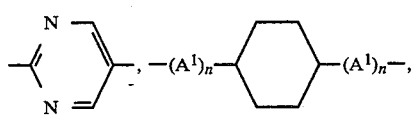

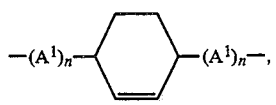

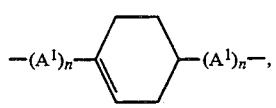

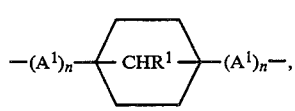

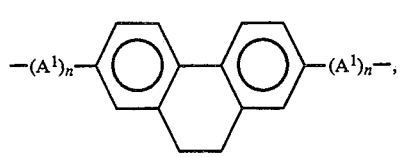

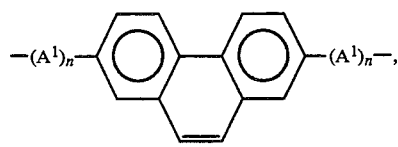

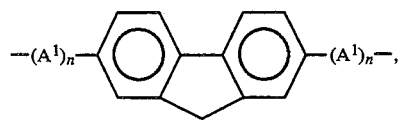

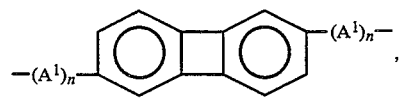

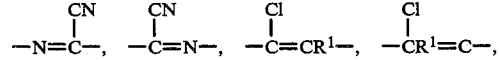

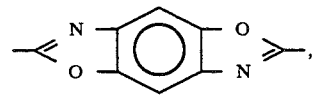

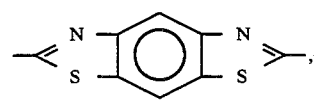

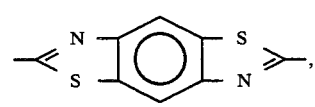

-continued

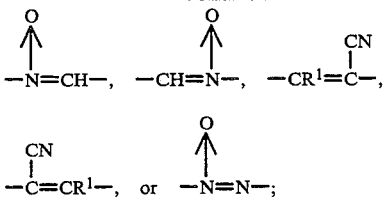

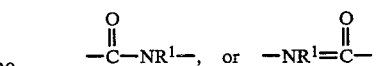

each A' is independently a divalent hydrocarbyl group having from 1 to about 10, preferably from 1 to about 4, carbon atoms; each $A^1$ is independently a $$-\overset{O}{\underset{\|}{C}}-,\ -O-\overset{O}{\underset{\|}{C}}-,\ -\overset{O}{\underset{\|}{C}}-O-,$$

$$-\overset{O}{\underset{\|}{C}}-NR^1-,\ \text{or}\ -NR^1=\overset{O}{\underset{\|}{C}}-$$

group; each R is independently hydrogen or a hydrocarbyl or hydrocarbyloxy group having from 1 to about 10, preferably 1 to about 4, carbon atoms, a halogen atom, preferably chlorine or bromine, a nitro group, a nitrile group, a phenyl group or a $-CO-R^1$ group; each $R^1$ is independently hydrogen or a hydrocarbyl group having 1 to about 3 carbon atoms; each $R^2$ is independenfiy hydrogen or a hydrocarbyl group having from 1 to about 10, preferably from 1 to about 3, carbon atoms, a halogen atom, preferably chlorine or bromine; m has a value from about 0.001 to about 6, preferably from about 0.01 to about 3; n has a value of zero or one; p has a value from zero to about 30, preferably from zero to about 5; and $p^1$ has a value from 1 to about 30, preferably from 1 to about 3. The aromatic rings can also contain one or more heteroatoms selected from nitrogen, oxygen, sulfur, and the like.

The term "hydrocarbyl" as employed hereinabove means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A group of Formulas II and V or the A' group of Formula VI, the hydrocarbyl group can also contain one or more heteroatoms selected from nitrogen, oxygen, sulfur, and the like. The term "hydrocarbyloxy" as employed hereinabove means a hydrocarbyl group having an oxygen linkage between it and the carbon atom to which it is attached.

Specific examples of polyepoxides which can be used to prepare the adducts, and which are free of rodlike mesogenic moieties, include for example the diglycidyl ethers of resorcinol, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A; the triglycidyl ether of tris(hydroxyphenyl)methane; the polyglycidyl ether of a phenol or substituted phenolaldehyde condensation product (novolac); the polyglycidyl ether of a dicyclopentadiene or an oligomer thereof and phenol condensation product; the advancement reaction products of the aforesaid di- and polyglycidyl ethers with aromatic di- or polyhydroxyl- or carboxylic acid-containing compounds including, for example, bisphenol A (4,4'-isopropylidenediphenol), o-, m-, p-dihydroxybenzene, 2,4-dimethylresorcinol, 4- chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenyl isopropyl)diphenyl ether, 4,4'-bis(p-hydroxyphenoxy)benzene, 4,4'-bis(p-hydroxyphenoxy)diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol; mixtures thereof; and the like.

In other embodiments of the present invention the polyepoxides used to prepare the epoxy resin adducts contain at least one rodlike mesogenic moiety. "Mesogenic moiety", or "mesogen", as used in the present invention refers to one or more rigid rodlike structural units which have been found to favor the formation of liquid crystal phases in the case of low molar mass substances. Thus the mesogen or rodlike mesogenic moiety is that structure responsible for molecular ordering. Specific mesogens include an aromatic ring pair connected by a rigid central linkage. These aromatic rings are para substituted in relation to each other and to the remainder of the compound in which they are present. The para substitution insures the highest aspect ratio. The aromatic rings are preferably bridged by a group selected from the following: a direct single bond, —C≡C—, —CR¹=N—, —N=N—, —O—CO—, —NR¹—CO—, —CR¹=N—N=CR¹—, —CR¹=CR¹—CO—, —CR¹=CR¹—, —N=CR¹—, —CO—O—, —CO—NR¹—, —CO—CR¹=CR¹—, —CO—O—N=CR¹—, —CR¹=N—O—OC—, —CO—NR¹—NR¹—OC—, —CR¹=CR¹—O—OC—, —CO—O—CR¹=CR¹—, —O—OC=CR¹=CR¹, —CR¹=CR¹—CO—O—, —CHR¹—O—CO—CR¹=CR¹—, —CR¹=CR¹—CO—O—CHR¹—, —CHR¹—CO—O—CR¹=CR¹—, —CR¹=CR¹—O—CO—CHR¹—, —CO—S—, —S—OC—, —CH₂—CH₂—CO—O—, —O—OC—CH₂—CH₂—, —C≡C—C≡C—, —CR¹=CR¹—CR¹=CR¹—,

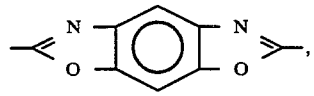

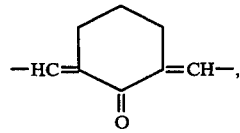

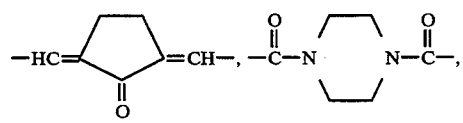

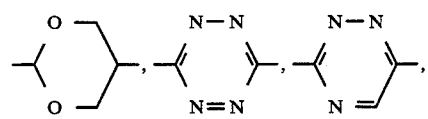

-continued

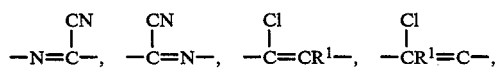

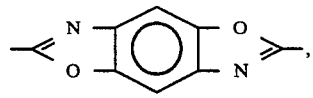

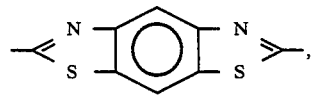

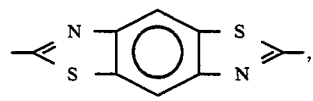

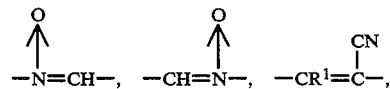

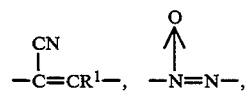

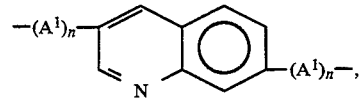

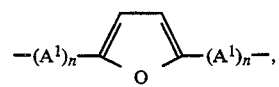

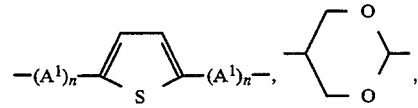

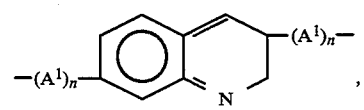

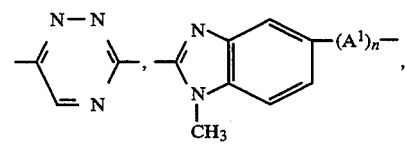

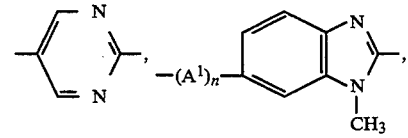

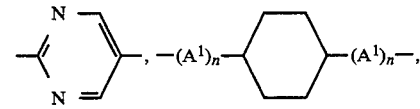

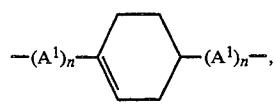
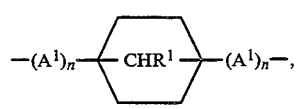
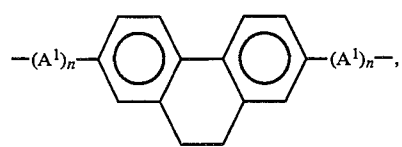
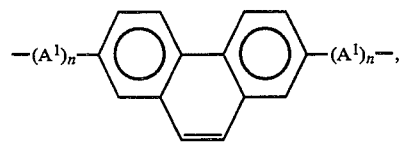
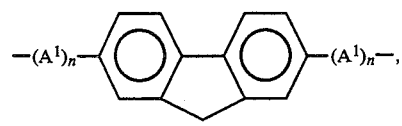
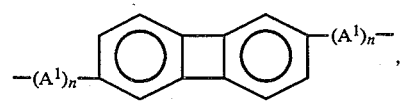
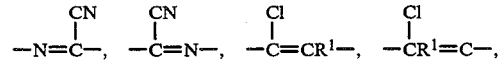
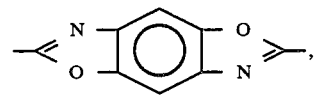
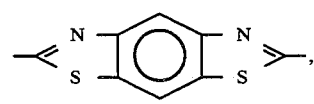

group and n, $A^1$ and $R^1$ are as hereinbefore described.

The rodlike mesogenic moiety or moieties are connected with the remainder of the compound by means of glycidyl ether linkages

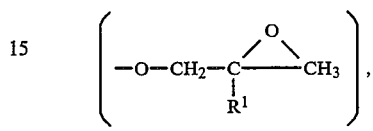

or secondary hydroxyalkylidene linkage(s)

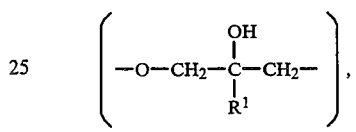

which are present when p has a value greater than zero. The epoxy resins containing a rodlike mesogenic moiety which can particularly be employed herein include those represented by the aforementioned Formulas II, V and VI, wherein at least about 80 percent of the molecules are para substituted by both the bridging groups (—A—) and by the glycidyl ether and hydroxyalkylidene linkages which are present when p has a value greater than zero. For Formula VI the para substitution is with respect to the direct bond between the aromatic rings. To optimize the aspect ratio, it is preferred that the aromatic ring substituents (R in Formulas II, V and VI) are hydrogen or methyl groups.

Representative polyepoxide compounds containing a rodlike mesogenic moiety include, for example, the diglycidyl ethers of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)phenoxy)diphenyl, 3,3',5,5'-tetramethyl-4-4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4'-hydroxyphenyl-4-hydroxybenzoate, 4,4'-dihydroxy-alpha-methylstilbene, 4,4'-dihydroxy-alpha-cyanostilbene, the diglycidyl ethers of the dihydric phenols represented by the following formulas:

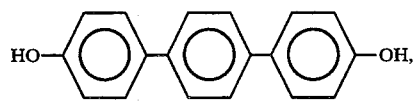

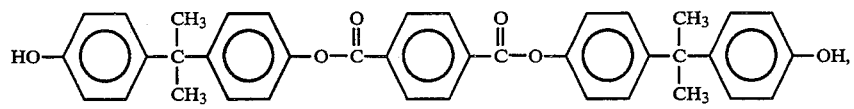

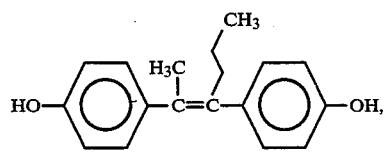
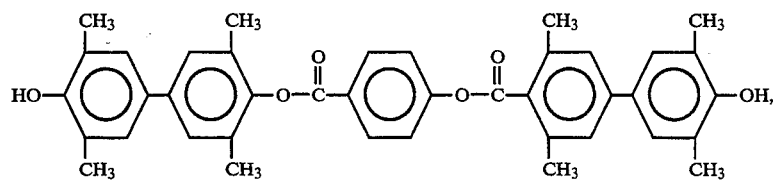
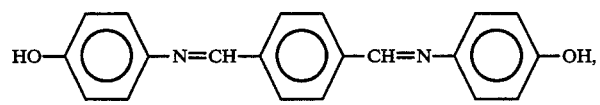
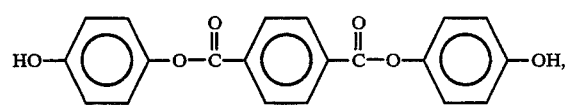
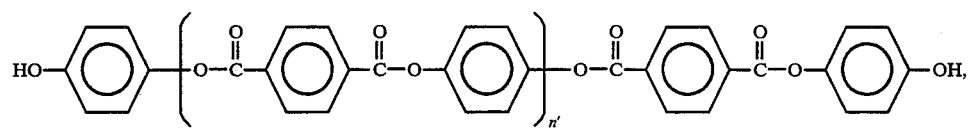
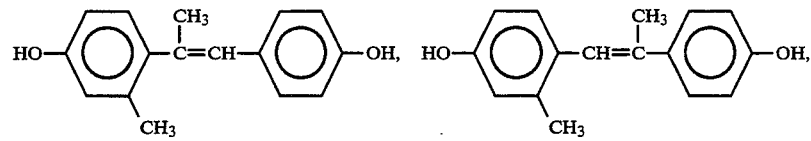
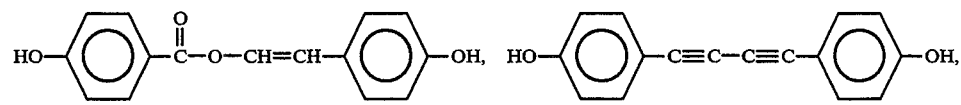
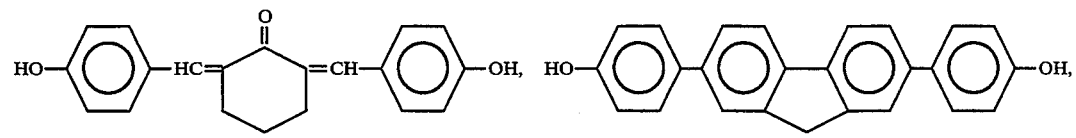
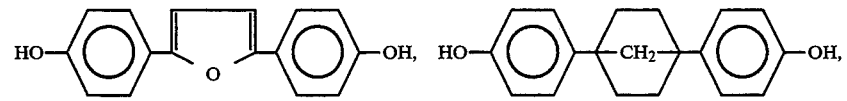
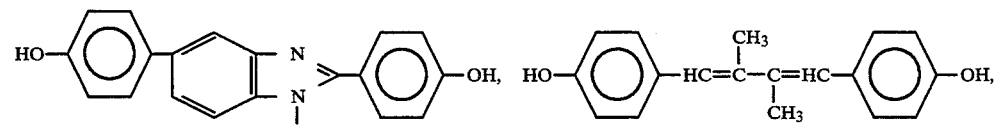
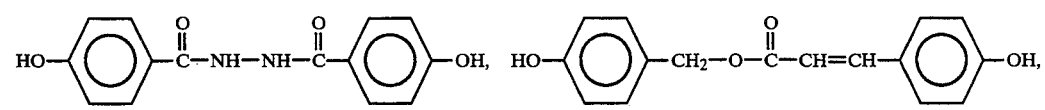

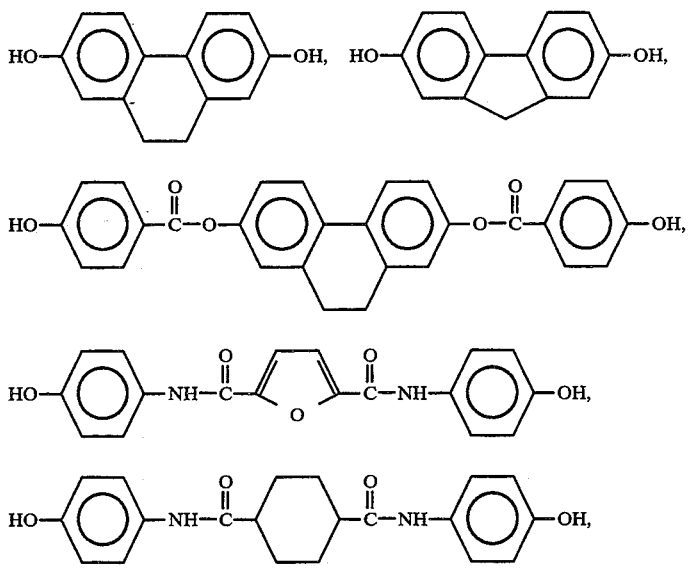

wherein n' has a value from 1 to about 10. Also suitable are the products resulting from advancing the aforementioned diglycidyl ethers with aromatic dihydroxyl or carboxylic acid containing compounds including, for example, all of the previously listed diphenol precursors to the diglycidyl ethers containing a rodlike mesogenic moiety; mixtures thereof and the like.

To prepare the polyepoxides useful for preparing the epoxy resin adducts of the present invention, epoxidation of di- and polyhydroxy aromatic compounds (or di- and polycarboxylic acids) can be performed by the known methods described in, for example, Handbook of Epoxy Resins by Lee and Neville, McGraw-Hill, 1967; Jpn. Kokai Tokyo Koho JP 62 86,484 (87 96,484); EP 88-008358/92; and Journal of Applied Polymer Science, vol. 23, 1355–1372 (1972), all of which are incorporated herein by reference. This usually includes reacting the respective di- or polyhydroxy aromatic compound (or di- and polycarboxylic acids) with an epihalohydrin such as, for example, epichlorohydrin or methyl epichlorohydrin, followed by dehydrohalogenation with a basic-acting material such as, for example, an alkali metal hydroxide, typically sodium hydroxide, and finally recovery of the resulting glycidyl ether (or ester) product. For the production of polyepoxides from di- and polyhydroxy aromatic compounds possessing functional groups or linkages that are sensitive to hydrolysis under the reaction conditions employed in certain epoxidation chemistries, alternate techniques of preparation can be employed. For example, Japanese Patents 58-206579 and 63-010617 teach preparation of the diglycidyl ether of the bisphenol represented by the following formula

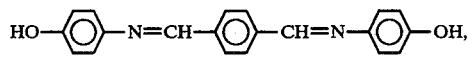

which is a compound containing azomethine linkages known to be sensitive to hydrolysis. It is also possible to perform an anhydrous epoxidation including azeotropic removing the water and epichlorohydrin from a reaction mixture consisting of epichlorohydrin, a diphenol, a phase transfer catalyst such as, for example, benzyltrimethylammonium chloride, and, optionally, one or more solvents while adding aqueous sodium hydroxide. This anhydrous epoxidation is preferably conducted under a vacuum. Alternatively non-aqueous sodium hydroxide can be used. In order to control reaction exotherm, the solid sodium hydroxide is typically added to the epoxidation reaction mixture in aliquots as a powder. A typical anhydrous epoxidation technique is described in U.S. Pat. No. 4,499,255, which is incorporated herein by reference in its entirety. The anhydrous epoxidation of 4'-hydroxyphenyl-4-hydroxybenzoate, a compound containing a hydrolytically sensitive ester linkage is taught in U.S. Pat. No. 4,762,901, which is incorporated herein by reference in its entirety.

Another method of preparing the polyepoxides useful for preparing the epoxy resin adducts of the present invention is advancement reaction of di- and polyglycidyl ethers with di- and polyhydroxy aromatic compounds (or di- and polycarboxylic acids). Advancement is described in, for example, the aforementioned Handbook of Epoxy Resins, and is generally known to those skilled in the art. The advancement generally involves mixing and heating the di- or polyhydroxy aromatic compound (or di- and polycarboxylic acid) and the di- or polyglycidyl ether. A catalyst such as, for example, ethyltriphenylphosphonium acetate.acetic acid complex, tetrabutylphosphonium bromide, tetrabutylammonium bromide or benzyltrimethylammonium chloride, is preferably added to facilitate the advancement reaction. Suitable advancement catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; and 4,177,216; which are incorporated herein by reference.

For the production of advanced polyepoxides using di- or polyhydroxy aromatic compounds which are of low solubility in the di- or polyglycidyl ether reactant or which possess relatively high melting points, one or more solvents are preferably added to the advancement reaction mixture. Care should be taken to utilize only those solvents which are inert to reaction with any of the reactants or the epoxide product. Advancement reaction of the di- or polyglycidyl ethers can also be performed using primary monoamines, bis(secondary diamines), or aromatic di- or polythiol compounds.

Suitable aromatic di- and polyhydroxyl containing compounds which can be reacted with the di- or polyepoxides to prepare advanced polyepoxides include, for example, those represented by the Formulas I, II, IV, V or VI above, wherein p has a value of zero and the glycidyl ether groups are replaced with hydroxyl groups. Particularly suitable di- or polyhydroxyl containing compounds include, for example, resorcinol, catechol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, 4,4'-dihydroxybiphenyl, 4,4'-dihydroxystilbene, 4,4'-dihydroxydiphenylacetylene, 4,4'-dihydroxybenzanilide, 4,4'-dihydroxy-α-methylstilbene, 4,4'-dihydroxydiphenylazomethine, 4,4'-dihydroxyazobenzene, 4,4'-dihydroxyazoxybenzene, 4,4'-bis((4-hydroxy)phenoxy)-diphenyl, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxybiphenyl, 4,4'-dihydroxychalcone, 4,4'-dihydroxy-α-cyanostilbene, 4,4'-dihydroxyphenylbenzoate, mixtures thereof and the like.

Suitable di- and polycarboxylic acids which can also be used to prepare advanced epoxides include, for example, 1,4-cyclohexane dicarboxylic acid, 4,4'-dicarboxybiphenyl, 4,4'-dicarboxy-α-methylstilbene, 4,4'-dicarboxydiphenylacetylene, 4,4'-dicarboxystilbene, 4,4'-dicarboxydiphenylazomethine, 4,4'-dicarboxydiphenylmethane, 4,4'-dicarboxydiphenyl oxide, 4,4'-dicarboxydiphenyl sulfide, 4,4'-dicarboxydiphenyl sulfone, 1,4-benzenedicarboxylic acid, mixtures thereof and the like.

Preferably the advancement reaction is carried out at a temperature of from about 25° C. to about 250° C., more preferably from about 60° C. to about 200° C. Reaction times from about 15 minutes to about 24 hours are preferred, with from about 30 minutes to about 4 hours being more preferred.

Suitable monoepoxide compounds containing one or more rodlike mesogenic moieties, which are useful in the preparation of the epoxy resin adducts containing rodlike mesogenic moieties, are prepared using conventional chemistry that is well known in the art. These compounds preferably contain an average of about one 1,2-epoxide group per molecule. In one embodiment of the present invention the monoepoxides can be prepared by reacting a compound containing an average of one epoxide-reactive group per molecule with an epihalohydrin, such as epichlorohydrin. Following reaction the product is dehydrohalogenated using a basic-acting material, such as an alkali metal hydroxide, and then the monoglycidyl ether product is recovered. The compound containing an average of one epoxide-reactive group per molecule can also contain one or more rodlike mesogenic moieties. For the production of monoepoxides possessing functional groups or linkages that are sensitive to hydrolysis under the reaction conditions employed in certain epoxidation chemistries, alternate techniques of preparation such as are previously described for the polyepoxides can be employed.

Suitable monoepoxide compounds which are free of rodlike mesogenic moieties include, for example, the aliphatic, cycloaliphatic and aromatic monoglycidyl ethers such as, for example, butyl glycidyl ether, phenyl glycidyl ether, cresyl glycidyl ether, o-, m-, and p-methylphenyl glycidyl ether, naphthyl glycidyl ether, cyclohexyl glycidyl ether, the monoglycidyl ester of benzoic acid, mixtures thereof and the like.

Suitable compounds containing an average of one group reactive with an epoxide group and one or more rodlike mesogenic moieties per molecule which can be reacted with epihalohydrin to provide the corresponding monoepoxide are represented by the Formulas VII or VIII below:

M—Q  (VII)

M—R'—Q  (VIII)

wherein Q is an epoxide-reactive group; M is a group containing two or more aromatic rings bridged by a rigid central linkage; and R' is a divalent hydrocarbon group having from one to about 12 carbon atoms and may be linear, branched, cyclic, aromatic or a combination thereof and may be substituted with one or more inert groups, such as, for example, a methoxy group, or may contain one or more inert heteroatom containing linkages, such as, for example, an ether linkage. Epoxide-reactive groups represented by Q include —OH, —NHR", —SH, —COOH, and the like. Typical rigid central linkage groups for bridging the aromatic rings include, for example, a direct bond, or a —CR¹=C-R¹—, —C—C—, —N=N—, —CR¹=N—, —CR¹=N—N =CR¹—, —CR¹=CR¹—CO—, —O—CO—, —NR¹—CO—, —N=CR¹—, —CO—O—, —CO—NR¹—, —CO—CR¹=CR¹—, —CO—O—N=CR¹—, —CR¹=N—O—OC—, —CO—NR¹—NR¹—OC—, —CR¹=CR¹—O—OC—, —CO—O—CR¹—, —CR¹—, —O—OC=CR¹=C-R¹—, —CR¹=CR¹—CO—O—, —CH-R¹—O—CO—CR¹=CR¹—, —CR¹=C-R¹—O—CO—CHR¹—, —CHR¹—CO—O—CR¹=C-R¹—, —CR¹=CR¹—O—CO—CHR¹—, —CO—S—, —S—OC—, —CH²—CH²—CO—O—, —O—O-C—CH²—CH², —C≡C—C≡C—, —CR¹=C-R¹—CR¹=CR¹—,

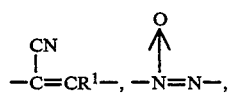

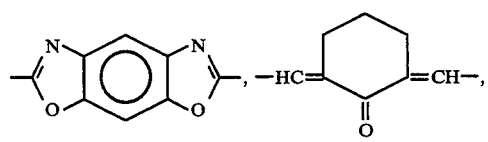

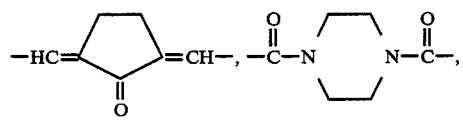

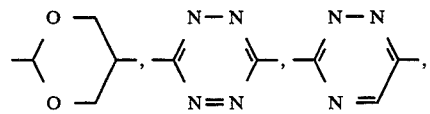

-continued

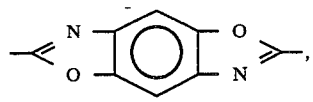

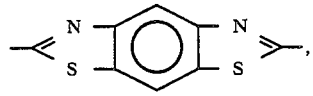

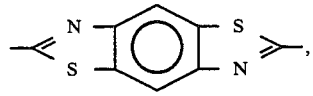

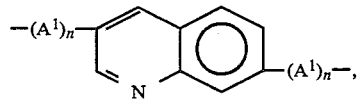

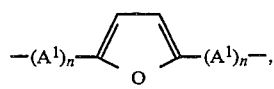

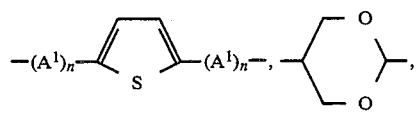

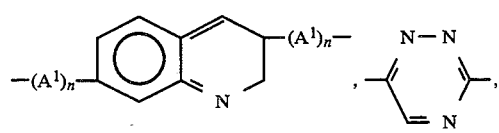

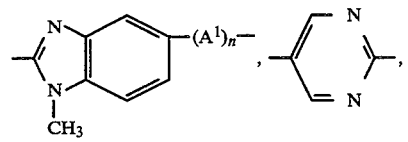

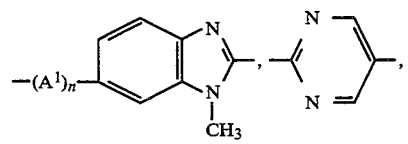

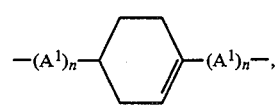

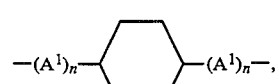

-continued

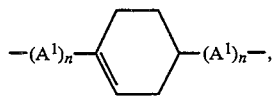

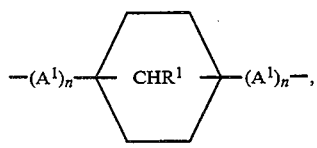

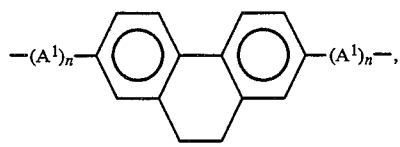

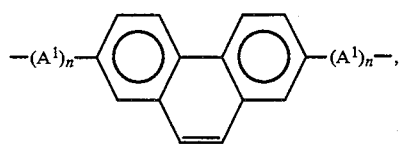

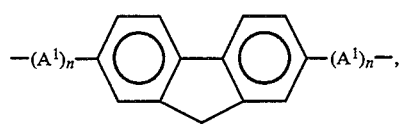

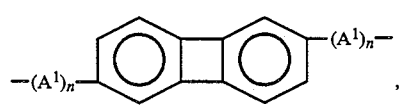

$$-N{=}\overset{CN}{C}-, \quad -\overset{CN}{C}{=}N-, \quad -\overset{Cl}{C}{=}CR^1-, \text{ or } -\overset{Cl}{CR^1}{=}C-,$$

group and the like; wherein each $R^1$—, and $A^1$ are as hereinbefore defined and $R''$ is a divalent hydrocarbon group which has from about 1 to about 20 carbon atoms and which can be linear, branched, cyclic, aromatic or a combination thereof. The rigid central linkage is required to bridge the aromatic rings to provide at least about 80 percent para substitution. The aromatic rings present in the M group can be inertly substituted; however, unsubstituted aromatic rings are preferred. The aromatic rings can also contain one or more heteroatoms selected from nitrogen, oxygen, sulfur, and the like.

This class of monoepoxide compounds containing rodlike mesogenic moieties can be represented by the following Formulas IX or X

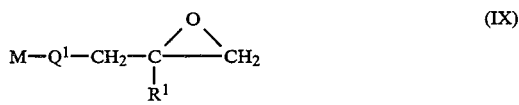  (IX)

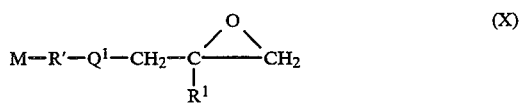  (X)

wherein M, $R^1$, $R'$ and $R''$ are as previously defined and $Q^1$ is —O—, —NR''—, —S—, —CO—O—, and the like.

Representative of the compounds containing one or more rodlike mesogenic moieties and a single epoxide-reactive group, which can be used to prepare the monoepoxides useful in the present invention, are, for example, p-hydroxydiphenyl; p-N-methylaminodiphenyl; p-hydroxyphenylbenzoate; monomethylether of hydroquinone terephthalate; monomethylether of 4,4'-dihydroxydiphenyl; mono-n-butylether of 4,4'-dihydroxydiphenyl; monomethylether of 4,4'-dihydroxystilbene; 4(4-hydroxybenzoyl)benzoic acid; 4-phenylbenzoic acid; or those compounds represented by the following formulas

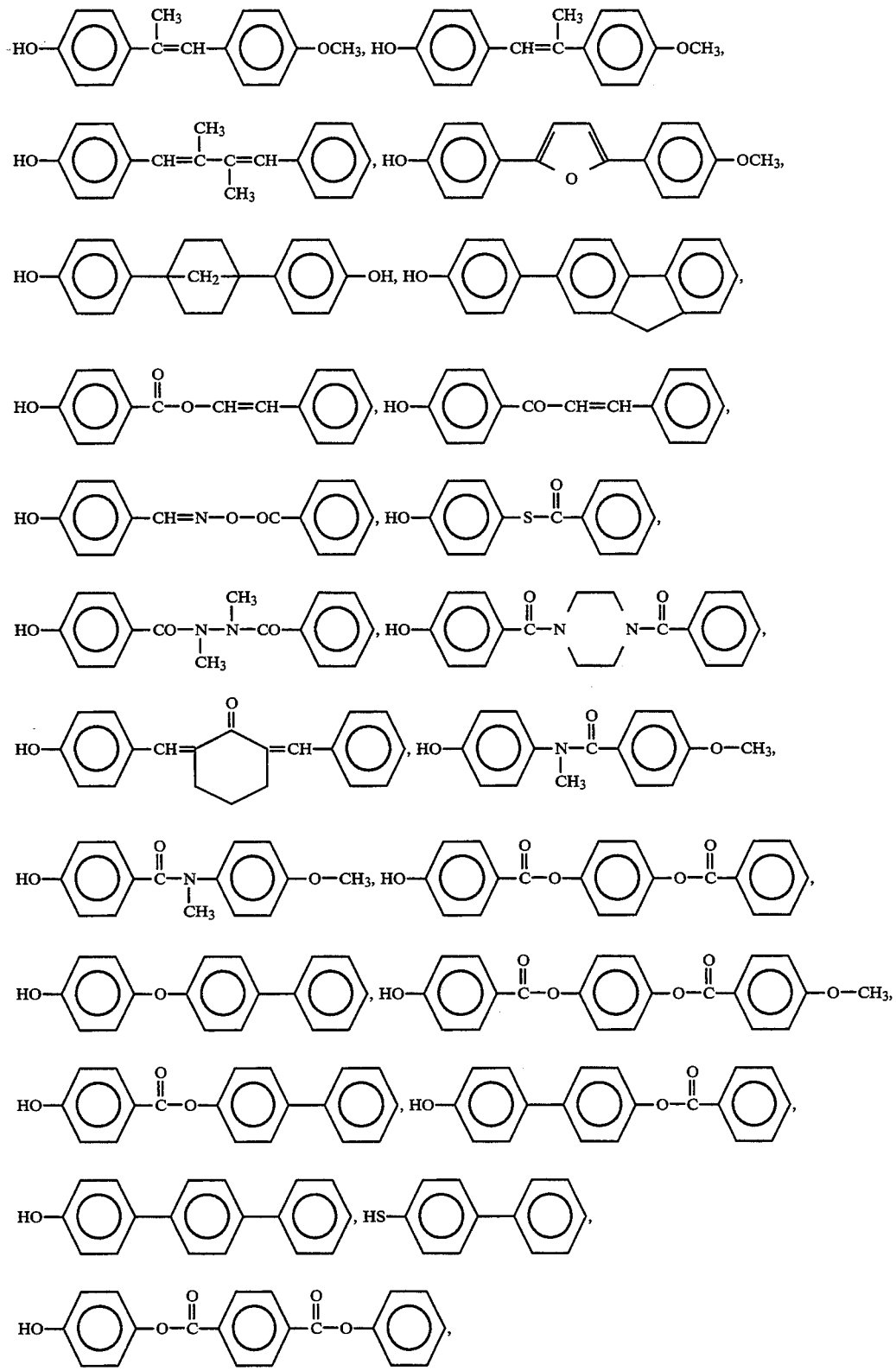

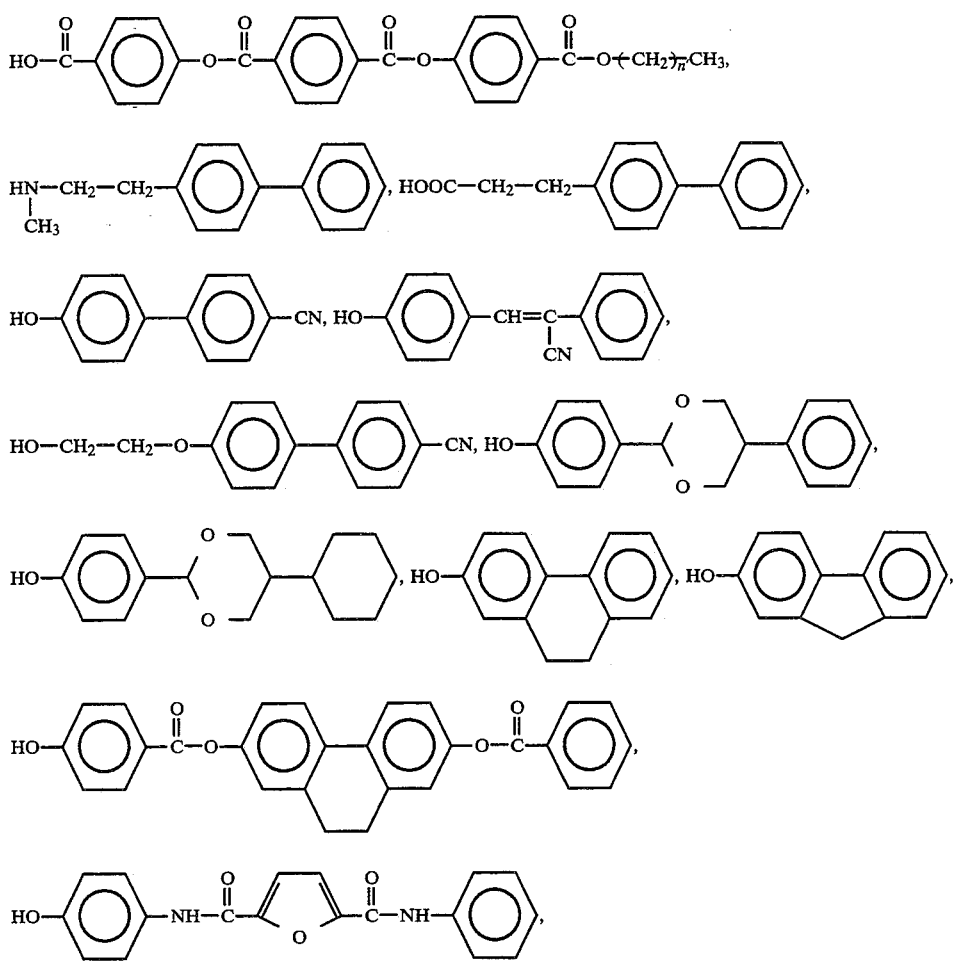

mixtures thereof and the like, wherein n' is as is hereinbefore defined.

A second class of the monoepoxide compounds containing a rodlike mesogenic moiety include those which are typically prepared by the epoxidation of a compound containing an average of one epoxidizable olefinic unsaturated group per molecule and one or more rodlike mesogenic moieties per molecule. Typical methods for preparing these monoepoxide compounds include conversion of the olefin precursor to a chlorohydrin by hypochlorous acid treatment followed by dehydrochlorination of the resultant chlorohydrin intermediate thus formed; treatment of the olefin precursor with one or more organic peracids (Prilezhaev Reaction) or peracid forming compounds such as, for example, perbenzoic acid, m-chloroperbenzoic acid, acetaldehyde monoperacetate, monoperphthalic acid, peracetic acid, performic acid, trifluoroperacetic acid and 3,5-dinitroperoxybenzoic acid; and treatment of the olefin precursor with one or more inorganic peracids such as, for example pertungstic acid. Details concerning these methods are taught in, for example, the aforementioned Handbook of Epoxy Resins, pages 3-1 to 3-24 (1967) published by McGraw-Hill, Inc.; D. Swern, Organic Reactions, volume 7, pages 378-433 (1953) published by John Wiley and Sons, Inc.; D. Swern, Organic Peroxides, volume 2, pages 355-533 (1971) published by Wiley-Interscience; W. D. Emmons et al., Journal of the American Chemical Society 77, 89-92 (1955); and W. H. Rastetter et al., Journal of Organic Chemistry 43, 3163-3169 (1978). Alternative methods for preparing these monoepoxide compounds include reaction of the olefin precursor with oxygen or an alkyl peroxide, either directly or in the presence of a catalyst consisting of a complex of vanadium, titanium, cobalt or molybdenum. Details concerning these methods are taught in, for example, T. Katsuki et al., Journal of the American Chemical Society 102, 5974-5976 (1980); B. E. Rossiter et al., ibid. 103, 464-465 (1981); E. D. Mihelich et al., ibid. 103, 7690-7692 (1981); E. S. Gould et al., ibid. 90, 4573-4579 (1960); H. J. Ledon et al., ibid. 103, 3601-3603 (1981); L. D.-L. Lu et al., Journal of Organic Chemistry 49, 728-731 (1984); and R. A. Budnik et al., ibid. 41, 1384-1389 (1976). As will be recognized by the skilled artisan, a number of additional olefin epoxidation techniques are available, notably the use of chromyl complexes in direct olefin epoxidation as taught by N. Miyaura et al., Journal of the American Chemical Society 105, 2368-23 (1983); the use of a peroxysulfur intermediate in olefin epoxidation as taught by Y. H. Kim et al., Journal of Organic Chemistry 48, 1562-1564 (1983); the use of tungstate plus phosphate (arsenate) ions with hydrogen peroxide to epoxidize olefins as taught by C. Venturello et al., ibid. 48, 3831-3833 (1983); ferric chloride activated hydrogen peroxide in olefin epoxidation as taught by H. Sugimoto et al., ibid. 50, 1784-1786 (1985); and olefin epoxidation using sodium hypochlorite and tetraphenylporphyrinatomanganese acetate as taught by M. E. DeCarvalho et al., *Tetrahedron Letters* 24, 3621–3624 (1983). The aforementioned references are incorporated herein by reference.

When olefins are to be used as starting materials to prepare the monoepoxides of the present invention, rodlike mesogen-containing compounds can preferably selected. These preferably contain an average of one epoxidizable olefin group per molecule and are represented by the formula:

$$M-(T)_n-(R')_n-Q' \qquad (XI)$$

wherein M, $R^1$, R' and R" are as hereinbefore defined; each n independently has a value of zero or one; T is a divalent heteroatom selected from the group consisting of —O—, —NR"—, —S—, or —CO—O—; and Q' is an epoxidizable monoolefin group. The rigid central linkage groups for bridging the aromatic rings contained in M is preferably substantially unreactive under the reaction conditions used for the epoxidation. Thus, typical rigid central linkage groups include, for example, a direct bond, —O—CO—, —NR$^1$—CO—, —CO—O—, —CO—NR$^1$—,

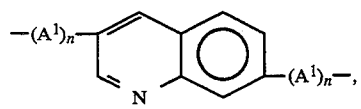

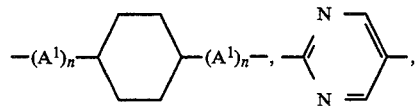

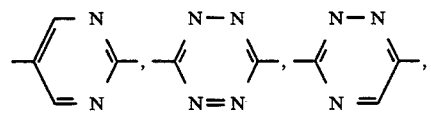

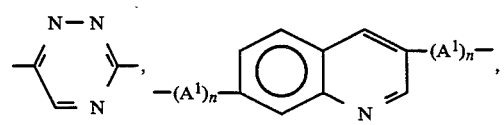

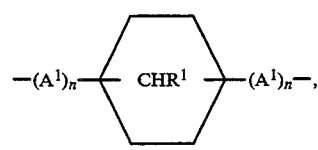

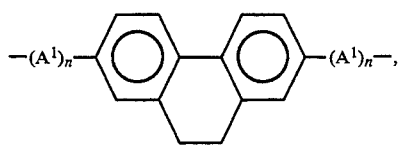

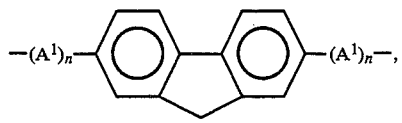

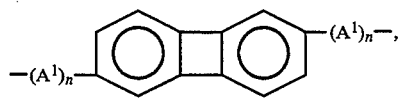

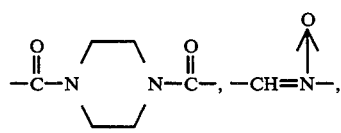

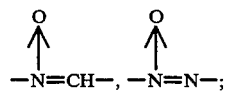

group and the like; and n, $A^1$ and $R^1$ are as hereinabove described.

The monoepoxides prepared from the rodlike mesogen-containing olefin starting material can be represented by the following Formula XII $$M-(T)_n-(R')_n-Q^2 \qquad (XII)$$

wherein M, R' and T are as defined above and $Q^2$ is the epoxidized olefin group such as, for example,

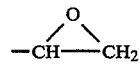

Suitable compounds containing one or more rodlike mesogenic moieties and an average of one epoxidizable olefinic unsaturated group per molecule include, for example, those represented by the following formulas:

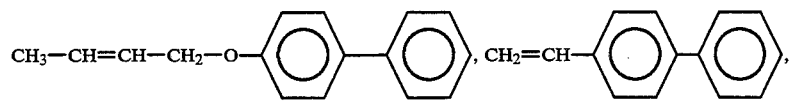

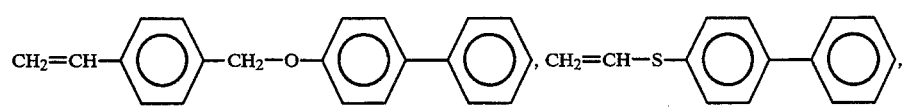

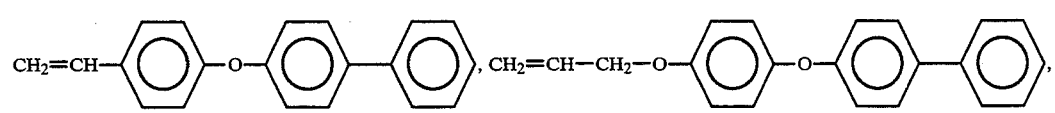

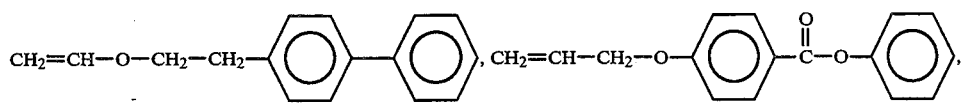
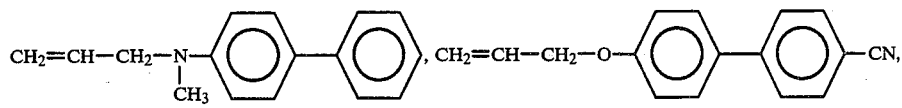
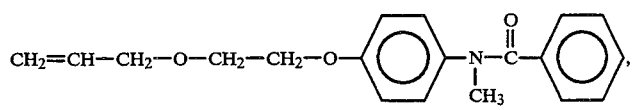
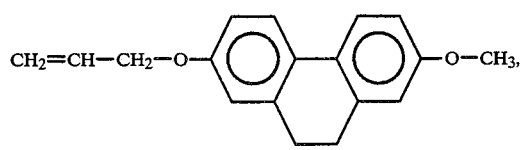
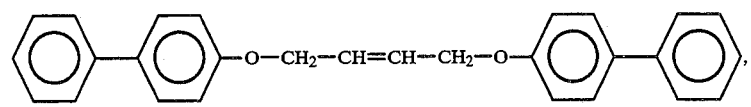
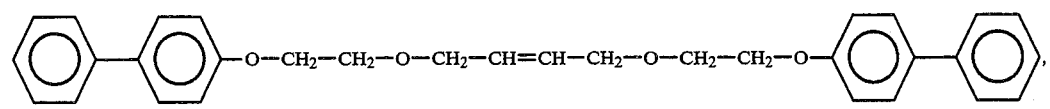
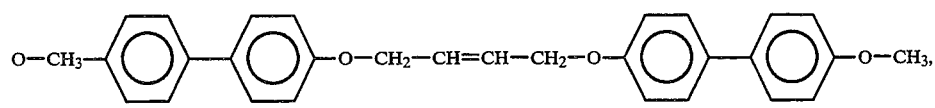
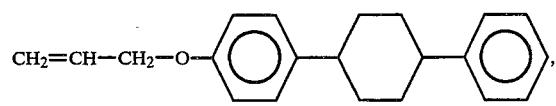
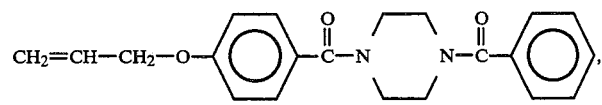
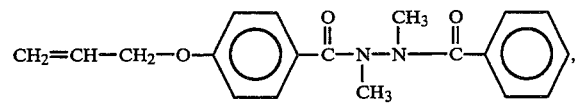
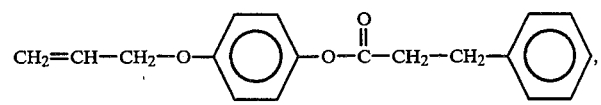
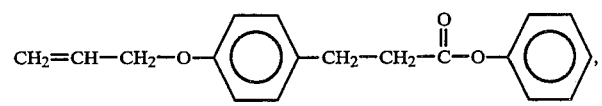
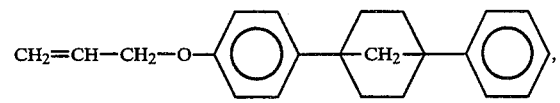

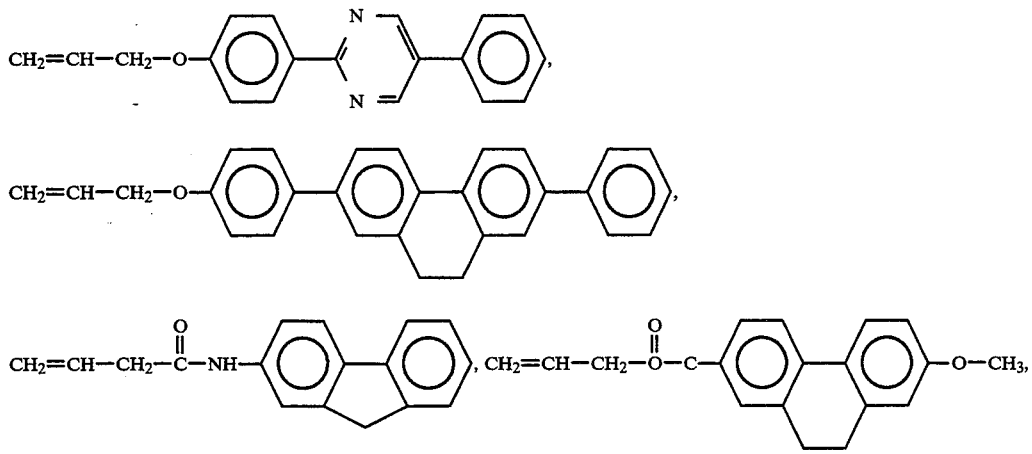

mixtures thereof and the like. Although it is not specifically indicated by the monoolefin structural formulas above, many of the synthetic methods can be used to provide optical activity (chirality) in the resulting monoepoxides. This optical activity in the products of the present invention is especially desirable as a means of enhancing their molecular order.

Compounds containing a single epoxide-reactive group which can reacted with a polyepoxide to prepare the epoxy resin adducts used in the present invention include those containing at least one rodlike mesogenic moiety as shown in Formulas VII and VIII or those free of rodlike mesogenic moieties as shown in Formula XIII:

$$M^1-Q \qquad (XIII)$$

wherein $M^1$ is an aliphatic, cycloaliphatic or aromatic group and Q is as hereinbefore described, with the proviso that Q is not —OH when $M^1$ is an aliphatic or cycloaliphatic group.

Representative of the compounds containing a single epoxide reactive group that are free of rodlike mesogenic or rigid rodlike moleties include the phenols, such as, for example, phenol, o-, m- and p-methylphenol, o-, m- and p-nitrophenol, o-, m- and p-methoxyphenol, o-, m- and p-chlorophenol; the N-substituted compounds such as, for example, N-methylaniline, N-ethylaniline, N-ethyl-4-methylaniline, N-ethylbutylamine; the thio compounds such as, for example, benzenethiol, cyclohexanethiol, hexanethiol; the carboxylic acids such as, for example, benzoic acid, 4-methylbenzoic acid, naphthoic acid, cyclohexane carboxylic acid, hexanoic acid or any combination thereof and the like.

In another embodiment of the present invention a compound containing on the average per molecule two or more epoxide-reactive groups can be reacted with a monoepoxide to prepare the epoxy resin adduct. The epoxide-reactive compounds include those either free of or containing at least one rodlike mesogenic moiety and can be represented by Formulas I, II, III, IV, V and VI above wherein p has a value of zero, each $R^3$ is independently hydrogen or a hydrocarbyl group having from 1 to about 12 carbon atoms and the glycidyl ether groups are replaced with —OH, —NHR$^3$, —SH or —COOH groups, or by Formula XIV:

$$Q^3-M^2-Q^3 \qquad (XIV)$$

wherein $M^2$ is an aliphatic or cycloaliphatic group and each $Q^3$ is independently a —NHR$^3$, —H or —COOH group.

Representative of the compounds containing on the average per molecule two or more epoxide-reactive groups are di- and polyphenols, in which the epoxide-reactive groups are hydroxyl groups. A number of these have been described above as being also suitable for use in the preparation of advanced polyepoxides.

Representative of the epoxide-reactive compounds which can be reacted with a monoepoxide to prepare the epoxy resin adducts are those containing on the average per molecule two or more —COOH groups. These include, for example, 1,4-cyclohexane dicarboxylic acid; 4,4'-dicarboxybiphenyl; 4,4'-dicarboxy-α-methylstilbene; 4,4'-dicarboxydiphenylacetylene; 4,4'-dicarboxystilbene; 4,4'-dicarboxydiphenylazomethine; 4,4'-dicarboxydiphenylmethane; 4,4'-dicarboxydiphenyl oxide; 4,4'-dicarboxydiphenyl sulfide; 4,4'-dicarboxydiphenyl sulfone; 1,4-benzenedicarboxylic acid; adipic acid; 1,4-cyclohexane dicarboxylic acid; and mixtures thereof. The carboxylic acid containing compounds can be used alone or in combination.

Representative of the epoxide-reactive compounds which can be reacted with a monoepoxide to prepare the epoxy resin adducts are those containing on the average per molecule two or more —NHR$^3$ groups. These include, for example, o-, m-, and p-diaminobenzene; 2,3,5,6-tetramethyl-1,4-diaminobenzene; 2,2-bis(4-aminophenyl)propane; 2,2-bis(4-aminophenyl)ethane; 1,1-bis(4-aminophenyl)propane; 4,4'-diaminodiphenylmethane; 2,2'-diaminodiphenyl; 4,4'-diaminodiphenyl; 4,4'-diaminomethylstilbene; 4,4'-diaminostilbene; 3,3',5,5'-tetramethyl-4,4'-diaminodiphenyl; 3,3',5,5'-tetramethyl-4,4'-diaminophenyl; 3,3',5,5'-tetrachloro-4,4'-diaminodiphenyl; 4,4'-diaminodiphenyl ether; 4,4'-bis(4-aminophenoxy)diphenyl ether; 4,4'-diaminodiphenyl sulfone; 4,4'-diaminodiphenyl disulfide; 3,3',5,5'-tetraethyl-4,4'-diaminodiphenyl sulfone; 1,1'-bis(4-aminophenyl)cyclohexane; bis-(2-amino-1-naphthyl)methane; 4,4'-diaminobenzophenonone; 4,4'-diaminodiphenyl sulfide; 3-phenyl-4,4'-diaminodiphenyl propane; 3,3'-dimethoxy-4,4'-diaminodiphenyl propane; 2,2',5,5'-tetraethyl-4,4'-diaminodiphenyl propane; 2,2',5,5'-tetraaminodiphenyl sulfone; tris(aminophenyl)methane; aniline formaldehyde condensation products; 1,6-hexanediamine; 1,4-diaminocyclohexane; and all types of secondary amine containing compounds prepared by alkylation of the primary amine containing compounds named above. The polyamine containing compounds can be used alone or in combination.

Compounds containing on the average per molecule two or more —SH groups can also be used to react with a monoepoxide to prepare the epoxy resin adducts of the present invention. These thiol-containing compounds include, for example, o-, m-, and p-dimercaptobenzene; 2,3,5,6-tetramethyl-1,4-dimercaptobenzene; 2,2-bis(4-mercaptophenyl)propane; 2,2-bis(4-mercaptophenyl)ethane; 1,1-bis(4-mercaptophenyl)propane; 4,4'-dimercaptodiphenyl methane; 2,2'-dimercaptodiphenyl; 4,4'-dimercaptodiphenyl; 4,4'-dimercaptodimethylstilbene; 4,4'-dimercaptostilbene; 4,4'6,6'-tetramethyl-4,4'-dimercaptodiphenyl; 3,3',5,5'-tetrachloro-4,4'-dimercaptodiphenyl; 4,4'-dimercaptodiphenyl ether; 4,4'-bis(4-mercaptophenoxy)diphenyl ether; 4,4'-dimercaptodiphenyl sulfone; 4,4'-dimercaptodiphenyl disulfide; 3,3',5,5'-tetraethyl-4,4'-dimercaptodiphenyl sulfone; 1,1'-bis(4-mercaptophenyl)cyclohexane; bis-(2-mercapto-1-naphthyl)methane; 4,4'-dimercaptobenzophenone; 4,4'-dimercaptodiphenyl sulfide; 3-phenyl-4,4'-dimercaptodiphenyl propane; 3,3'-dimethoxy-4,4'-dimercaptodiphenyl propane; 3,3'-dimethoxy-4,4'-dimercaptodiphenyl propane; 2,2',5,3'-tetramercaptodiphenyl sulfone; tris(mercaptophenyl)methane; 1,6-hexanedithiol; 1,4-dithiocyclohexane; and mixtures thereof. The polythiol containing compounds can be used alone or in combination.

Once the monoepoxides, diepoxides or polyepoxides and epoxide-reactive compounds as described above have been selected, epoxy resin adducts can be prepared therefrom. Reaction conditions for forming these epoxy resin adducts, which contain at least one rodlike mesogenic moiety, vary widely, depending upon the type and amount of reactants employed; the type and amount of catalyst(s) used, if any; the type and amount of solvent(s) used, if any; the mode of addition of the reactants employed; and other variables understood by those skilled in the art. The reaction can be conducted at atmospheric, superatmospheric or subatmospheric pressures and preferably at temperatures of from about 0° C. to about 260° C., more preferably from about 25° C. to about 220° C., and most preferably from about 50° C. to about 190° C. The time required to complete the reaction depends not only upon the variables, but also upon the temperature. Higher temperatures require shorter periods of time whereas lower temperatures require longer periods of time. Generally, however, times of from about 5 minutes to about 1 week, more preferably from about 30 minutes to about 72 hours, most preferably from about 60 minutes to about 48 hours are preferred.

A catalyst is optionally employed to prepare the epoxy resin adducts containing one or more rodlike mesogenic moieties. Suitable catalysts include the phosphines, quaternary ammonium compounds, phosphonium compounds, sulfonium compounds, tertiary amines, mixtures thereof and the like. The amount of catalyst used, if any, depends upon the particular reactants and catalyst selection. However, preferably the catalyst is used in amounts of from about 0.01 to about 3, preferably from about 0.01 to about 1.5, most preferably from about 0.03 to about 0.75 percent by weight, based upon the weight of the epoxy-containing compound. Because the reaction of epoxide groups with amine or substituted amine groups is autocatalytic, an advancement catalyst is frequently not required in this instance.

Particularly suitable catalysts are the quaternary phosphonium and ammonium compounds such as, for example, ethyltriphenylphosphonium bromide, -chloride, -iodide, -phosphate or -acetate; ethyltriphenylphosphonium acetate.acetic acid complex; tetrabutylphosphonium bromide, -chloride, -iodide or -acetate; tetrabutylphosphonium acetate.acetic acid complex; butyltriphenylphosphonium tetrabromoisophenate; butyltriphenylphosphonium bisphenate; butyltriphenylphosphonium bicarbonate; benzyltrimethylammonium chloride; tetramethylammonium hydroxide; mixtures thereof; and the like.

It is also preferable to use one or more solvents inert in the epoxy resin adduct forming reaction of this embodiment of the present invention, especially when low solubility of a reactant containing a rodlike mesogenic moiety is encountered. The use of a solvent can provide for easier processing and recovery as well as an increased rate of conversion to the desired epoxy resin adduct product. The inert solvent can be removed at the completion of the reaction using conventional methods such as distillation, evaporation or vacuum stripping. Among the preferred solvents are the aliphatic ketones, such as methylamyl ketone; the chlorinated hydrocarbons, such as perchloroethylene; and the aromatic hydrocarbons, such as chlorobenzene and xylene.

The polyepoxide or monoepoxide and the epoxide-reactive compound(s) are employed in proportions which provide an equivalent ratio, of epoxide is groups to epoxide-reactive groups, of from about 1:0.80 to about 1:1.25. More preferred is a ratio of from about 1:0.90 to about 1:1.05, and most preferred is from about 1:1. Purification or post reaction treatment methods such as, for example, recrystallization, chromatographic separation, zone refining, crystal refining, wiping film distillation, vacuum distillation, solvent extraction, preferential chemical derivatization/separation, combinations thereof and the like can be employed to remove any stoichiometric excess of an unreacted reactant from the epoxy resin adduct product.

In reacting the epoxide and the epoxide-reactive compound(s) to form the epoxy resin adduct the order of addition is not critical. Thus, the epoxide and the epoxide-reactive compound(s) can be concurrently mixed together and subjected to the reaction conditions, or one component can be added to the other component in increments up to and including continuous addition. If increments are added, all or a part of an added increment can be allowed to react prior to addition of the next increment. However, when as a polyepoxide an advanced epoxy resin is selected, for example, from those represented by Formulas I, II, IV and VI wherein p has a value greater than zero, it may be desirable to prereact a part or all of the backbone hydroxyl groups formed as a consequence of the advancement reaction. One method useful for the prereaction of backbone hydroxyl groups in advanced polyepoxides with an ethylenically unsaturated ether, such as methyl isopropenyl ether, is taught by Perry in U.S. Pat. No. 3,804,795, which is incorporated herein by reference. A second method useful for the prereaction of backbone hydroxyl groups in advanced epoxy resins with a trihalomethyl alkyl aromatic compound, such as trichloroacetophenone, is taught by Cavitt et al. in U.S. Pat. No. 4,575,543, which is incorporated herein by reference. A third method useful for the prereaction of backbone hydroxyl groups in advanced polyepoxides involves the use of one or more monoisocyanate containing compounds. In this method, reaction conditions which form a urethane linkage via reaction of a hydroxyl and an isocyanate group are employed. Typical monoisocyanates include phenyl isocyanate, 4-methylphenyl isocyanate, 2-methylphenyl isocyanate, cyclohexane isocyanate, dodecane isocyanate, mixtures thereof and the like.

Prereaction of a part or all of the backbone hydroxy groups of an advanced epoxy resin, prior to reaction with a compound containing a single epoxide reactive group, reduces the number of hydroxyl groups in the epoxy resin adduct product. The reduction of hydroxyl groups reduces the number of reaction sites per molecule of epoxy resin adduct for subsequent reaction with a polyisocyanate to form a polyurethane product. Crosslink density is thus decreased and the mobility and accessibility of the rodlike mesogenic moieties, resulting in enhanced capability for molecular association, is increased.

The epoxy resin adduct formed by the reactions described above contains a rodlike mesogenic moiety and is reacted with a polyisocyanate to prepare the polyurethanes of the present invention. Suitable polyisocyanates are well known in the art and contain an average of more than one isocyanate group per molecule. None, a part, or all of the polyisocyanate component(s) used herein may contain one or more rodlike mesogenic moieties. Isocyanate containing materials and their preparation are described in, for example, the *Encyclopedia of Chemical Technology*, third edition, volume 13, pages 789–818, published by John Wiley and Sons (1981), and by Siefken in *Justus Leibegs Annalen der Chemie*, 562, pages 75–136, both of which are incorporated herein by reference. Thus, any aliphatic, cycloaliphatic, polycycloaliphatic, aryl substituted aliphatic, aromatic or heterocyclic polyisocyanates or prepolymers and oligomers thereof can be used herein. Typical of the polyisocyanates useful in the preparation of the polyurethanes of the present invention are represented by the following formulas:

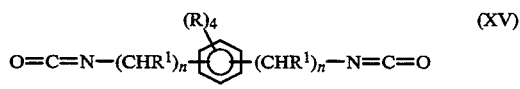

(XV)

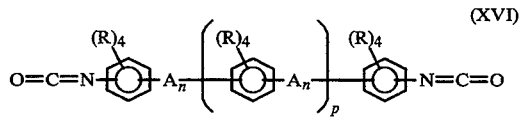

(XVI)

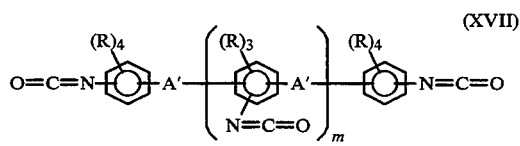

(XVII)

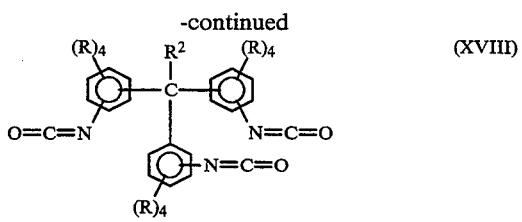

(XVIII)

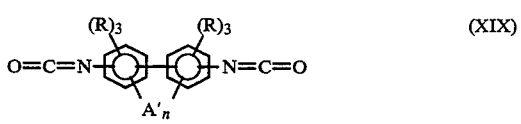

(XIX)

O=C=N—M²—N=C=O       (XX)

wherein A, A', R, R¹, R², m, n, p and M² are as hereinbefore described.

Representative of the polyisocyanates useful to prepare the compositions of the present invention which are free of rodlike mesogenic moieties include, for example, the following: 1,6-hexamethylene diisocyanate; 1,4-cyclohexane diisocyanate; 1,3-cyclohexane diisocyanate; 2,4-hexahydrotoluene diisocyanate; 2,6-hexahydrotoluene diisocyanate; perhydro-4,4'-diisocyanatodiphenyl methane; perhydro-2,4'-diisocyanatodiphenyl methane; perhydro-2,2'-diisocyanatodiphenyl methane; perhydro-3,3'-dimethyl-4,4'-diphenyldiisocyanate; 2,4-toluene diisocyanate; 2,6-toluene diisocyanate; 4,4'-diisocyanatodiphenyl methane; 2,4'-diisocyanatodiphenyl diisocyanate; 2,2'-diisocyanatodiphenyl methane; 2,4'-diisocyanatodiphenyl methane; naphthalene-1,5-diisocyanate; 4,4'-diisocyanatotrimethyl cyclohexane; polyphenylene polymethylene polyisocyanate; mixtures thereof and the like.

In preparing the polyurethane compositions of the present invention an epoxy resin adduct prepared as described above is reacted with a polyisocyanate, provided at least one of the reactants contains a rodlike mesogenic moiety. Polyisocyanates containing a rodlike mesogenic moiety which can be employed herein include, for example, those represented by Formulas XVI and XIX above, wherein at least 80 percent of the molecules are para substituted by both the bridging groups (—A—) and the isocyanate groups (—N=C=O). For Formula XIX, the para substitution (at least 80 percent) is with respect to the direct bond between the aromatic rings. To optimize the aspect ratio of the rodlike mesogenic moiety, it is preferred that the aromatic ring substituents (R in Formulas XVI and XIX) are hydrogen or methyl groups.

Representative polyisocyanates containing a rodlike mesogenic moiety include, for example, 4,4'-diisocyanatobiphenyl, 3,3'-dimethyl-4,4'-diisocyanatodiphenyl, 3,3',5,5'-tetramethyl-4,4'-diisocyanatodiphenyl; 2,2',6,6'-tetramethyl-4,4'-diisocyanatodiphenyl; 4,4'-diisocyanatostilbene; 4,4'-diisocyanatodiphenylacetylene; 4,4'-diisocyanatoazobenzene; 4,4'-diisocyanatoazoxybenzene; 4,4'-bis((4-isocyanato)phenoxy)diphenyl; 4,4-diisocyanatobenzanilide; 4'-isocyanatophenyl-4-isocyanatobenzoate; 4,4'-diisocyanato-alpha-methylstilbene; 4,4'-diisocyanato-alpha-cyanostilbene; 4,4'-diisocyanato-alpha-ethylstilbene; 4,4'-diisocyanatodiphenylazomethine,

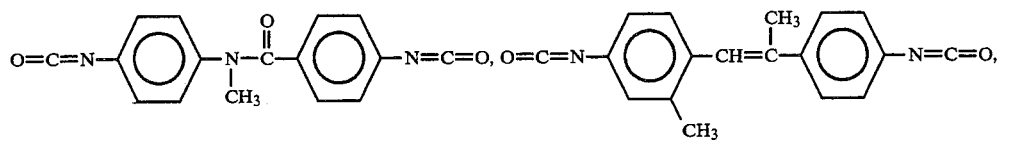
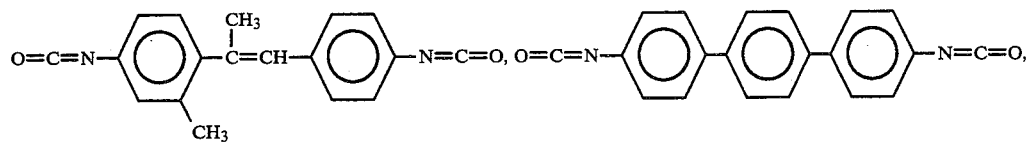
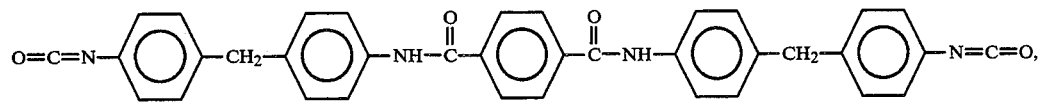
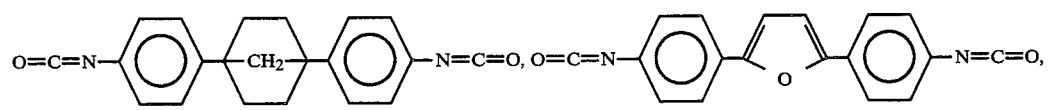
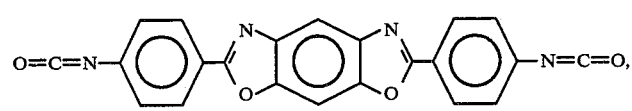
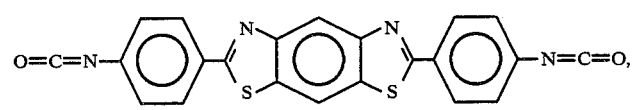
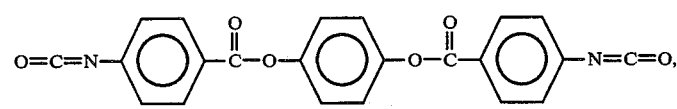
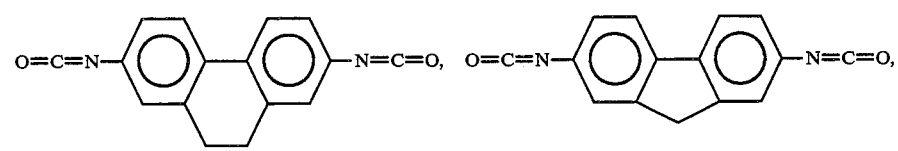
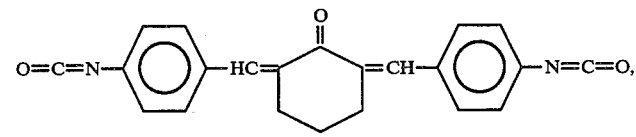
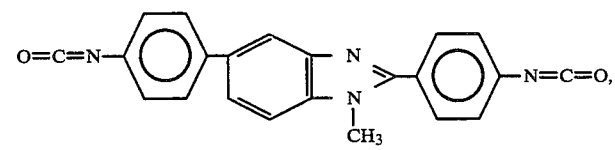
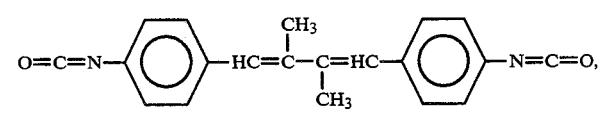
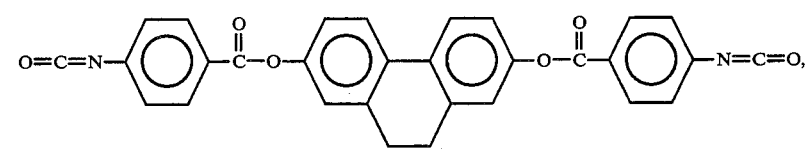

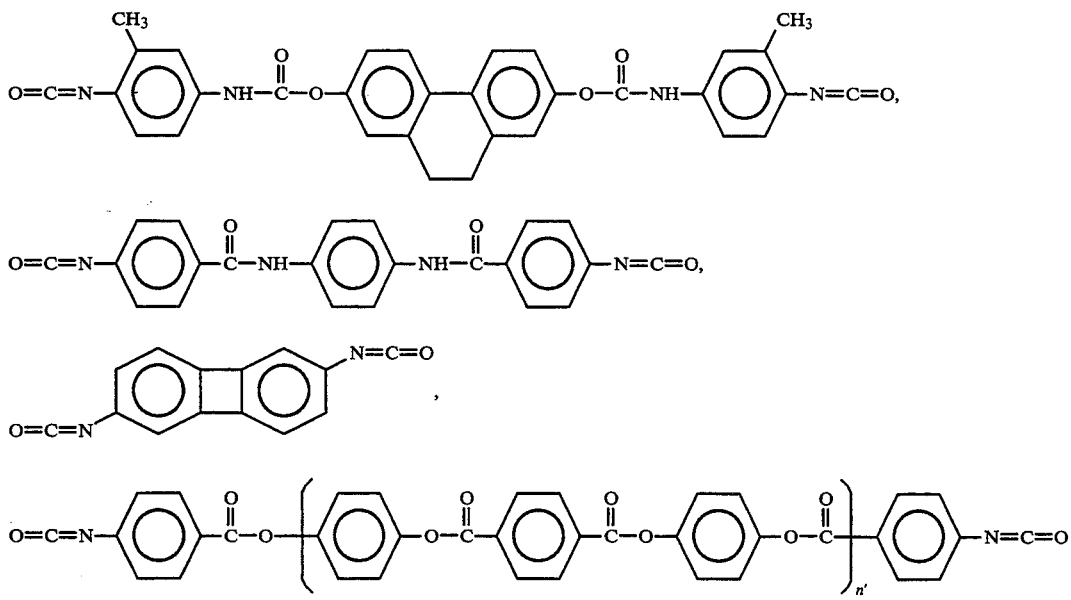

wherein n' has a value from 1 to about 10.

Additional polyisocyanates which are useful to prepare the polyurethane compositions of the present invention include polyisocyanates containing urethane groups such as, for example, the reaction product of a toluene diisocyanate and trimethylolpropane described in the *Polyurethane Handbook*, pages 77–79, published by Macmillan Publishing Co., Inc. (1985) or those described in U.S. Pat. No. 3,394,164, both of which are incorporated herein by reference; polyisocyanates containing carbodiimide groups such as are described in U.S. Pat. No. 3,152,162 and by Ozaki in *Chemical Reviews*, 72, pp. 486–558 (1972), both of which are incorporated herein by reference; polyisocyanates containing allophanate groups such as are described in British Patent No. 994,890, Belgian Patent No. 761,626 and in the aforementioned *Polyurethane Handbook* reference, page 81, all of which are incorporated herein by reference; polyisocyanates containing isocyanurate groups such as are described in U.S. Pat. Nos. 3,001,973 and 3,154,522, German Patents Nos. 1,002,789, 1,027,394 and 1,222,067 and in the aforementioned *Polyurethane Handbook* reference, pages 79–80, all of which are incorporated herein by reference; polyisocyanates containing urea groups such as are described in the aforementioned *Polyurethane Handbook* reference, pages 81–82, which is incorporated herein by reference; polyisocyanates containing biuret groups such as are described in U.S. Pat. Nos. 3,124,605 and 3,201,372, British Patent No. 889,050, and in the aforementioned *Polyurethane Handbook* reference, page 82, all of which are incorporated herein by reference; polyisocyanates containing acylated urea groups such as are described in German Patent No. 1,230,778, which is incorporated herein by reference; polyisocyanates containing ester groups such as are described in U.S. Pat. No. 3,567,763, British Patent Nos. 965,474 and 1,072,956 and German Patent No. 1,231,688, all of which are incorporated herein by reference; mixtures thereof and the like.

The commercially available isomeric mixtures of toluene diisocyanates, diisocyanatodiphenyl methanes and polyphenyl polymethylene polyisocyanates, as well as the purified polyisocyanates, notably 4,4'-diisocyanatodiphenyl methane, are preferred for use in preparing the compositions of the present invention. Especially preferred are mixtures of either toluene diisocyanate or diisocyanatodiphenyl methane with a lesser amount of a rodlike mesogenic polyisocyanate containing two or more aromatic rings bridged by a rigid central linkage of the type hereinbefore described and wherein all substitutions on the aromatic rings are in the para positions. Thus, a blend of 3,3'-dimethyl-4,4'-diisocyanatodiphenyl in 4,4'-diisocyanatodiphenyl methane is especially preferred.

In preparing the polyurethane materials of the present invention it is also possible, and preferred, to incorporate one or more materials containing on the average two or more isocyanate-reactive hydrogens per molecule. It is especially preferred that all or a part of said material containing two or more isocyanate reactive hydrogens per molecule simultaneously contains at least one rodlike mesogenic moiety. This is in addition to the epoxy resin adduct which is, by definition, also isocyanate-reactive. Suitable materials can be selected from the well-known classes of hydroxyl, amine and sulfhydryl containing materials. Typical examples of these materials are listed in the aforementioned *Polyurethane Handbook*, pages 42–60; in "*Polyurethanes: Chemistry and Technology, Part I, Chemistry*", High Polymers, volume XVI, pages 32–61, published by Interscience Publishers (1965); and in *Flexible Urethane Foams Chemistry and Technology*, pages 27–43, published by Applied Science Publishers (1982), all of which are incorporated herein by reference. These materials include the polyether polyols; amine capped polyether polyols; hydroxyl containing polyesters; aliphatic hydroxyl containing polycarbonates; hydroxyl containing polythioethers; hydroxyl containing polyolefins; hydroxyl containing urethanes and ureas prepared, for example, by the reaction of a diisocyanate and a stoichiometric excess of a diol, or by the reaction of a diisocyanate and a stoichiometric excess of a diamine, respectively; hydroxyl and/or amino containing polyesteramides; amino containing polyamides; alkanolamines; aliphatic, cycloaliphatic, polycycloaliphatic diols and polyols;

polyamines; mercaptoalcohols; mercaptoamines; polymer modified polyols, i.e., containing vinyl polymer or copolymer grafted polyol, vinyl polymer or copolymer and unreacted polyol; polyols containing dispersed polyurea particles, i.e., polyharnstoff dispersion polyols; mixtures thereof; and the like.

Polyether polyols possessing average molecular weights of from about 250 to about 6000 and from about 2 to about 8 hydroxyl groups are preferred materials containing on the average two or more isocyanate reactive hydrogens per molecule. Blends of these polyether polyols with aromatic diamines or other known "chain extenders", such as, for example, with 3,3'-dichloro-4,4'-diaminodiphenyl methane or 4,4'-methylene-bis(3-chloro-2,6-diethylaniline), are also preferred. Also preferred are blends of these polyether polyols with rodlike mesogen containing aromatic diamines, such as, for example, 3,3-dimethyl-4,4'-diaminodiphenyl.

In the general process of the present invention, an epoxy resin adduct and a polyisocyanate, at least one of which contains a rodlike mesogenic moiety, and, optionally, one or more addition isocyanate-reactive materials are combined in proportions which provide an equivalent ratio of isocyanate-reactive hydrogens to isocyanate groups of from about 1:0.90 to about 1.0:1.25, preferably from about 1:0.95 to about 1.0:1.1, to provide the polyurethane compositions of the present invention. The reaction may be performed in stages or increments or as a one-step process. Suitable reaction conditions, reaction times, reaction temperatures, and optional catalysts for preparation of the polyurethane compositions of the present invention are well known to those skilled in the art and are described in the aforementioned *Polyurethanes: Chemistry and Technology* reference, pages 129–217, and in the aforementioned *Encyclopedia of Chemical Technology* reference, pages 576–608, both of which are incorporated herein by reference.

In a preferred process of the present invention, the epoxy resin adduct is reacted with a stoichiometric excess of one or more polyisocyanates to form an isocyanate terminated prepolymer. A preferred range of from about 2:1 to about 20:1, more preferably from about 2.5:1 to about 8:1, moles of isocyanate groups to moles of isocyanate reactive hydrogens is used. The additional isocyanate-reactive material, containing on the average at least two isocyanate-reactive groups per molecule, can also be incorporated in this prepolymer and is preferably combined with the epoxy resin adduct prior to reaction with the polyisocyanate. The resultant product is an isocyanate terminated prepolymer containing excess polyisocyanate which can be used as a material having more than one isocyanate group per molecule for polyurethane forming reactions.

In another embodiment of the present invention, the epoxy resin adduct, alone or mixed with another isocyanate-reactive compound, is reacted with substantially less than a stoichiometric amount of one or more polyisocyanates to form a prepolymer terminated by active hydrogen groups such as hydroxyl groups. A preferred range of from about 0.05:1 to about 0.60:1, more preferably from about 0.20:1 to about 0.50:1, moles of isocyanate groups to moles of isocyanate reactive hydrogens is employed. The prepolymer product contains isocyanate reactive hydrogens and, as such, can then be reacted with a material having more than one isocyanate group per molecule to form a polyurethane product. Alternately, the prepolymer can be reacted with a stoichiometric excess of a polyisocyanate as previously described to form another prepolymer, which in this case is isocyanate terminated. Many other process configurations can be used to prepare the polyurethane compositions of the present invention and will be readily apparent to the skilled artisan.

It is also possible to use one or more compounds which are monofunctional (i.e., contain only one isocyanate reactive hydrogen per molecule) in reaction with an isocyanate group. These monofunctional materials are chain terminating species in the polyurethane forming reaction. Preferably, these monofunctional compounds, if used, are present in an amount sufficient to react with from about 0.01 to about 10 mole percent of the isocyanate groups. Examples of these monofunctional materials include, for example: aliphatic alcohols, such as ethylene glycol monomethyl ether, octanol, 2-ethylhexanol; and monoamines, such as dibutylamine, octodecylamine and aminocyclohexane.

In another embodiment of the present invention the epoxy resin adduct can also be prereacted, prior to use in the preparation of a polyurethane composition, to modify the type and/or number of hydroxyl groups present per molecule as well as its other properties, such as reactivity, solubility, melting point, viscosity and the like. For example, ethoxylation of the epoxy resin adduct converts secondary aliphatic hydroxyl groups to primary aliphatic hydroxyl groups. Alkoxylation can also be used to incorporate a desired quantity of aliphatic ether linkages to obtain certain property modifications.

Alternatively, reaction of the epoxy resin adduct with a compound containing a single hydroxyl reactive group, such as, for example, a monoisocyanate can be used to reduce the number of hydroxyl groups per molecule available for subsequent reaction in polyurethane forming reactions. This chemistry is identical to that previously described, for prereaction of hydroxyl groups in advanced epoxy resins. Thus, a reaction product of one equivalent of a trifunctional epoxy resin, such as is shown in Formula IV where p equals zero, with three equivalents of a compound containing a single epoxide reactive group, such as a phenolic hydroxyl group, and a single rodlike mesogenic or rigid rodlike moiety, such as, for example, a biphenyl group, provides a secondary aliphatic hydroxyl containing triol. Reaction of one of the hydroxyl groups therein with phenyl isocyanate converts this triol to a secondary aliphatic hydroxyl containing diol.

Certain of the polyurethane compositions of the present invention contain rodlike mesogenic groups as side chain (pendant) moieties. Thus, a polyurethane prepared from the diol resulting from the reaction of p-phenylphenol with a diglycidyl ether of bisphenol A and 4,4'-diisocyanatodiphenyl methane contains side chain diphenyl groups which are attached to the polymer chains via labile ether linkages, as shown:

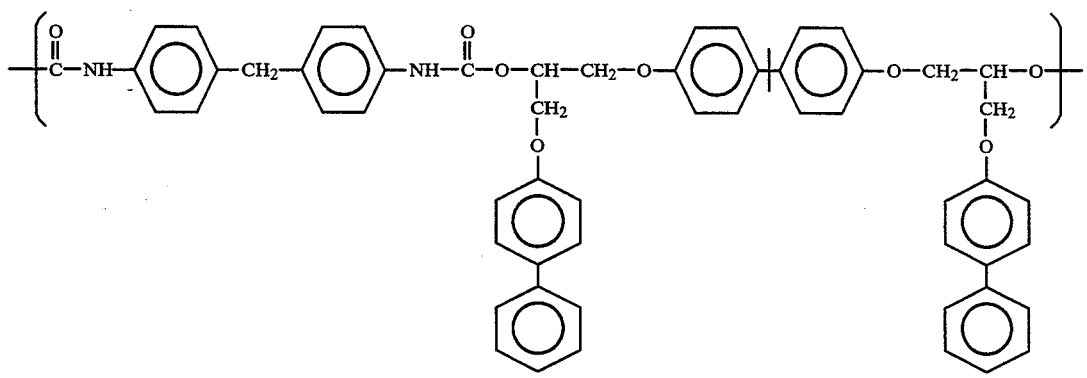

20

The molecular association of these rodlike mesogenic biphenyl side chain groups between polymer chains within the polyurethane matrix produces orientation in the soft segment phase (see, e.g., Example 2 in Table III of Example 8). This induced orientation in the soft segment phase of a polyurethane elastomer produced with a strain crystallizable poly(ethylene oxide) block results in enhancement of tensile strength and Die C tear strength, as well as reduced absorption of water (see, e.g., Example 19 in Table VII and Comparative Example 21 in Table VII).

Certain of the polyurethane compositions of the present invention can also contain rodlike mesogenic moieties in the main chains, in addition to those present as side chain groups. These most preferred compositions can be obtained (a) when all or a part of the polyisocyanate component contains one or more rodlike mesogenic moieties derived from two or more aromatic rings bridged by a rigid central linkage of the type described above; (b) when all or a part of the polyepoxide precursor to the epoxy resin adduct having at least one rodlike mesogenic moiety contains two or more aromatic rings bridged by a rigid central linkage of the type hereinbefore described; or (c) when both (a) and (b) occur simultaneously. Thus, a polyurethane prepared from the diol resulting from the reaction of p-phenylphenol with a diglycidyl ether of 4,4'-dihydroxydiphenyl and 4,4'-diisocyanatodiphenyl methane contains side chain diphenyl groups which are attached to the polymer chains via labile ether linkages as well as diphenyl groups in the main chains, as shown:

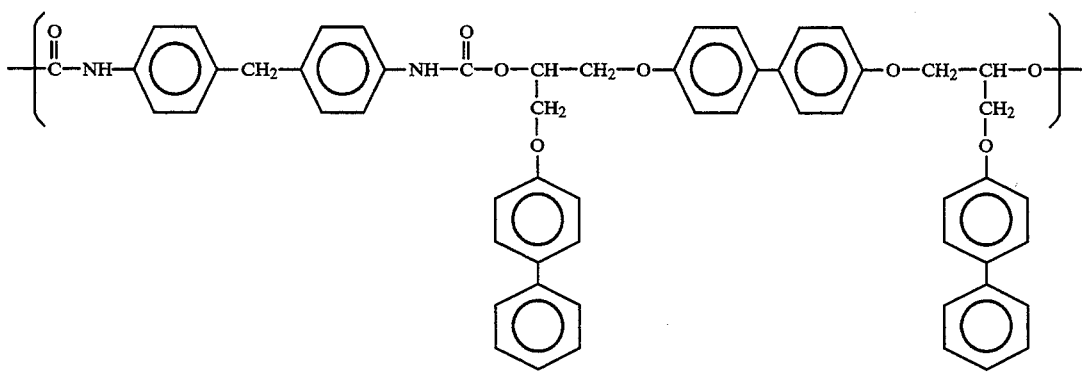

60

Similarly, a polyurethane prepared from the diol resulting from the reaction of p-phenylphenol with a diglycidyl ether of bisphenol A and 3,3'-dimethyl-4,4'-diphenyldiisocyanate contains side chain diphenyl groups which are attached to the polymer chains via labile ether linkages as well as diphenyl groups in the main chains, as shown:

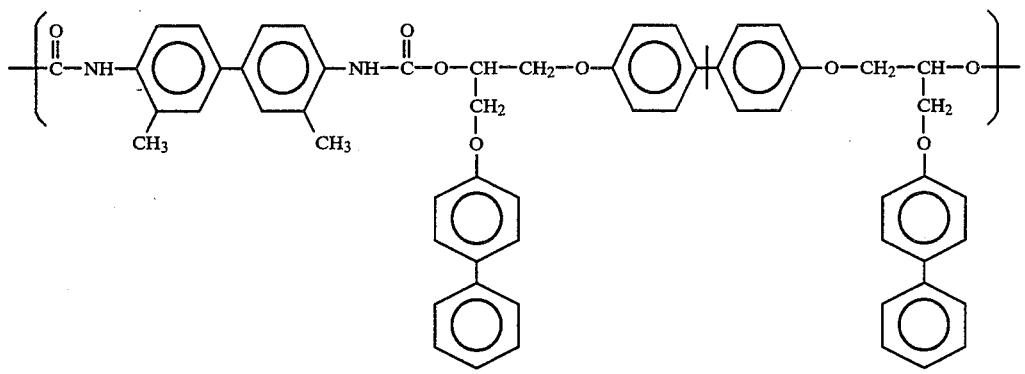

The molecular association of at least a part of these rodlike mesogenic biphenyl side chain groups with rodlike mesogenic biphenyl main chain groups produces orientation in both the soft and hard segment phases (see, e.g., Example 4 in Table III of Example 8). This induced orientation in the soft and hard segment phases of a polyurethane elastomer produced with a strain crystallizable poly(ethylene oxide) block results in enhancement of flexural strength/modulus, Die C tear strength and split tear strength, as well as reduced absorption of water (see, e.g., Example 20 in Table VII and Comparative Example 21 in Table VII).

Additional polyurethane compositions of the present invention which contain rodlike mesogenic moieties in the main chains in addition to those present as side chain groups result from the use of a chain extender component, all or a part of which contains one or more rodlike mesogenic moieties. The most preferred composition can contain additional rodlike mesogenic moieties in the main chains via use of a polyisocyanate component containing one or more rodlike mesogenic moieties and/or an epoxy resin adduct prepared from a polyepoxide precursor having at least one rodlike mesogenic moiety.

Alternatively, one or more epoxy resin adducts free of rodlike mesogenic moieties may be used to prepare polyurethanes of the present invention provided at least one other component used to prepare said polyurethane contains at least one rodlike mesogenic moiety.

One advantage of the compositions of the present invention is that molecular association of rodlike mesogenic functionalities in the polyurethane matrix provides molecular reinforcement manifested in enhanced mechanical properties. This reinforcement makes these materials particularly useful in applications requiring a higher degree of mechanical strength than that of many other, conventional polyurethane materials. The polyurethanes of the present invention can be made in cellular (foamed) or non-cellular forms, and can contain additives and adjutants which are used for well known purposes. For example, fillers, pigments, mold release agents, catalysts, blowing agents, surface active agents, cell regulators, reaction retarding agents, stabilizers, flame retarding substances, plasticizers, fungistats, bacteriostats, emulsifiers, weathering and aging retardants, reinforcing materials, solvents, adhesion promoters and the like can be employed as is customary in the art. The compositions of the present invention are particularly useful in the preparation of elastomers, rigid and structural foams, flexible foams, reaction injection molded articles, moldings, coatings, castings and the like.

During processing prior to curing and/or during cure of the curable compositions into a part, electric or magnetic fields or flow fields can be applied for the purpose of enhancing the orientation of the rodlike mesogenic moieties contained or developed therein which in effect improves the mechanical properties. As specific examples of these methods, Finkelmann et al, *Macromol. Chem.*, 180, 803–806 (March, 1979), which is incorporated herein by reference, induced orientation in an electric field, of thermotropic methacrylate copolymers containing rodlike mesogenic side chain groups decoupled from the main chain via flexible spacers. Orientation in a magnetic field of rodlike mesogenic side chain groups decoupled from the main chain via flexible spacers has been demonstrated by Roth and Kruecke, *Macromol. Chem.*, 187, 2655–2662 (November 1986). Magnetic field induced orientation of rodlike mesogenic main chain containing polymers has been demonstrated by Moore et al, *ACS Polymeric Material Sciences and Engineering*, 52, 84–86 (April–May 1985). Magnetic and electric field orientation of low molecular weight rodlike mesogenic compounds is discussed by W. R. Krigbaum in *Polymer Liquid Crystals*, pages 275–309 (1982) published by Academic Press, Inc. All of the above are incorporated herein by reference in their entirety.

In addition to orientation by electric or magnetic fields, polymeric mesophases can be oriented by drawing and/or shear forces which are induced by flow through dies, orifices, and mold gates. A general discussion for orientation of thermotropic liquid crystal polymers by this method is given by S. K. Garg and S. Kenig in *High Modulus Polymers*, pages 71–103 (1988) published by Marcel Dekker, Inc. which is incorporated herein by reference. For the rodlike mesogen containing polyurethanes based on the epoxy resin adducts, this shear orientation is preferably produced by processing methods such as reactive injection molding, extrusion, pultrusion, filming and the like.

The following examples are intended to be, and should be construed as being, illustrative only and are not limitative of the scope of the present invention in any way.

EXAMPLE 1

A. Preparation of an Epoxy Resin Adduct by the Reaction of p-Phenylphenol and Diglycidyl Ether of Bisphenol A p-Phenylphenol (170.20 grams, 1.00 hydroxyl equivalent) and a diglycidyl ether of bisphenol A (181.09 grams, 1.00 hydroxyl equivalent) having an epoxide equivalent weight (EEW) of 181.09 are added to a reactor and heated with stirring under a nitrogen atmosphere. Once a 90° C. reaction temperature is achieved, ethyltriphenylphosphonium acetate.acetic acid complex (70 percent by weight in methanol) (0.3513 gram, 0.10 percent by weight) is added to the reactor and heating is continued. After sixteen minutes, the reaction temperature reaches 175° C. and this reaction temperature is held for 174 minutes. The product is recovered as a light tan colored solid of the following structure:

the vacuum is released, and 168.34 grams of a liquid chain extender solution are injected into the reactor.

The liquid chain extender solution is prepared by mixing methylenebis(ortho-chloroaniline) (94.28 grams), propylene glycol polypropoxylate having an average molecular weight of 2000 (56.56 grams) and glycerine polypropoxylate capped with 18 percent ethylene oxide having an average molecular weight of 4850 (84.84 grams) at 110° C. with stirring for 20 minutes followed by degassing at 50° C. under vacuum for

Epoxide titration reveals the product to contain 0.20 percent residual epoxide while hydroxyl titration reveals 4,948 percent hydroxyl. Infrared spectrophotometric analysis of a portion of the product confirms the product structure (appearance of hydroxyl group absorbance at 3408 cm$^{-1}$, disappearance of epoxide group absorbance). A portion of the product dissolved in chloroform is reacted with excess phenyl isocyanate followed by rotary evaporation under vacuum to provide a light tan colored solid. Infrared spectrophotomeric analysis of film samples prepared from the reaction solution during the course of the reaction verifies the complete reaction of the hydroxyl groups of the product with the isocyanate groups (appearance of carbonyl group absorbance at 1737 cm$^{-1}$, disappearance of hydroxyl group absorbance). The phenyl isocyanate reaction product melts at approximately 80° C. to an isotropic fluid.

B. Synthesis of an Isocyanate Terminated Prepolymer Containing the Epoxy Resin Adduct (7.21 weight percent) Prepared by Reacting p-Phenylphenol and Diglycidyl Ether of Bisphenol A A portion of the reaction product of p- phenylphenol and diglycidyl ether of bisphenol A (72.14 grams, 7.21 weight percent) from A. above, a propylene glycol polypropoxylate having an average molecular weight of 2000 (216.42 grams, 21.64 weight percent), a glycerine polyproxylate capped with 18 percent ethylene oxide having an average molecular weight of 4850 (432.84 grams, 43.28 weight percent) and 4,4'-diisocyanatodiphenyl methane (278.60 grams, 27.86 weight percent) are added to an oven dried glass reactor and heated with stirring to 80° C. under a dry nitrogen atmosphere. After two hours of reaction at the 80° C. temperature, the transparent, light tan colored prepolymer liquid is recovered as a homogeneous solution and stored in a metal can under a dry nitrogen atmosphere. Ninety six hours later, titration of portions of the prepolymer reveals the presence of 6.955 percent isocyanate, as compared with a theoretical isocyanate amount of 6.5 percent.

C. Preparation of a Polyurethane Elastomer Casting

A portion of the isocyanate terminated prepolymer from B. above (400.2 grams) is added to an oven dried glass reactor and heated with stirring to 50° C. under a vacuum. After 120 minutes of degassing the 50° C. prepolymer under a vacuum of 1 millimeter of Hg or less, the prepolymer is cooled to 28° C., stirring is stopped, 30 minutes. Once the liquid chain extender solution is added, the vacuum is reestablished and vigorous mixing of the reaction mixture commences. After two minutes of mixing the reaction temperature has increased to 36° C.

At this time stirring is again stopped, the vacuum is released, and 0.20 milliliter of bismuth neodecanoate catalyst is injected into the reactor. Once the catalyst is been added, the vacuum is reestablished and vigorous mixing of the reaction mixture commences. After one minute of mixing, the reaction temperature has increased to 45° C. At this time stirring is stopped, the vacuum is released and the reactor contents are poured into a pair of preheated (100° C.) 7.15 inch by 10.15 inch by 100 mil aluminum molds. The molds are covered with steel covers and loaded into a hydraulic press with platens preheated to 100° C. The pressure on the molds in the press is increased to 1000 psi, released, and then increased to 10,000 psi. This pressure, concurrent with the 100° C. temperature is maintained for one hour. The molds are then removed and the slightly opaque light tan colored polyurethane elastomer castings are demolded and postcured for 16 hours at 100° C.

Physical and mechanical properties of the castings are tested and the test results reported in Table I. Testing methods and conditions are as described below:

1. Specific gravity of a pair of conditioned 1.5 gram samples is determined at 23° C.±2° C. using ASTM D 792 with the average value reported in Table I.

2. Hardness is determined using a Shore A durometer at 23° C.±2° C. with a conditioned test piece as specified in ASTM D 2240.

3. Bashore rebound (resilience) is determined at 23° C.±2° C. with conditioned test pieces as specified in ASTM D 2632.

4. Die C tear strength is determined at 23° C.±2° C. using conditioned test pieces (six) as specified in ASTM D 624.

5. Split tear strength is determined at 23° C.±2° C. using conditioned test pieces (six) as specified in ASTM D 470.

6. Water absorption is determined at 23° C.±2° C. using both conditioned test pieces (three) as well as predried test pieces (three) exposed to deionized water for one week. Predrying of the test pieces is completed in an oven maintained at 158° F. for sixteen hours prior to testing. The average value of weight percent increase for each respective test is reported in Table I.

7. Compression set under constant deflection in air (Method B) is determined at 23° C.±2° C. using conditioned test pieces and an applied 25 percent compression of the test pieces for 22 hours in accordance with ASTM D 395 and is reported in Table I as a percentage of the original thickness (Ct).

8. Flexural modulus is determined at 23° C.±2° C. using conditioned test pieces measuring one by three inches in accordance with ASTM D 790, Method I, Procedure B. The rate of crosshead motion is 0.5 inch per minute and a 2.0 inch span length is used.

9. Tensile properties are determined at 23° C.±2° C. using conditioned Type IV test pieces in accordance with ASTM D 638. The speed of testing is 20 inches per minute. The results are collectively given in Table I.

EXAMPLE 2

A. Synthesis of an Isocyanate Terminated Prepolymer Containing an Epoxy Resin Adduct (14.13 weight percent) Prepared by Reacting p-Phenylphenol and of Diglycidyl Ether of Bisphenol A A portion of the reaction product of p-phenylphenol and diglycidyl ether of bisphenol A (141.27 grams, 14.13 weight percent, prepared as described in Example 1 above), a propylene glycol polypropoxylate having an average molecular weight of 2000 (141.27 grams, 14.13 weight percent), a glycerine polyproxylate capped with 18 percent ethylene oxide having an average molecular weight of 4850 (423.80 grams, 42.38 weight percent) and 4,4'-diisocyanatodiphenyl methane (293.66 grams, 29.37 weight percent) are added to an oven dried glass reactor and heated with stirring to 80° C. under a dry nitrogen atmosphere. After two hours of reaction at the 80° C. temperature, the transparent, light tan colored prepolymer liquid is recovered as a homogeneous solution and stored in a metal can under a dry nitrogen atmosphere. Twenty-two hours later, titration of portions of the prepolymer reveals the presence of 6.412 percent isocyanate, as compared with a theoretical isocyanate amount of 6.5 percent.

B. Preparation of Polyurethane Elastomer Casting

A portion of the isocyanate terminated prepolymer from A. above (404.6 grams) is added to an oven dried glass reactor and processed as described in Example 1. A liquid chain extender solution (156.90 grams) is injected into the reactor. The liquid chain extender solution is prepared by mixing methylenebis(orthochloroaniline) (87.86 grams), propylene glycol polypropoxylate having an average molecular weight of 2000 (52.72 grams) and glycerine polypropoxylate capped with 18 percent ethylene oxide having an average molecular weight of 4850 (79.07 grams), as described in Example 1, including use of a bismuth neodecanoate catalyst. Polyurethane elastomer castings are prepared as described in Example 1, and testing of their physical and mechanical properties is done as described therein. The results are reported in Table I.

EXAMPLE 3

A. Preparation of an Epoxy Resin Adduct by the Reaction of 4(4-Hydroxybenzoyl)benzoic Acid and Diglycidyl Ether of Bisphenol A 4(4-Hydroxybenzoyl)benzoic acid (72.67 grams, 0.30 carboxylic acid equivalent) and a diglycidyl ether of bisphenol A (54.33 grams, 0.30 epoxide equivalent) having an epoxide equivalent weight (EEW) of 181.09 and methylamyl ketone (40.0 grams) are added to a reactor and heated with stirring under a nitrogen atmosphere. Once a 90° C. reaction temperature is achieved, ethyltriphenylphosphonium acetate.acetic acid complex (70 percent by weight in methanol) (0.127 gram, 0.10 percent by weight) is added to the reactor and heating is continued. After fifteen minutes the reaction temperature reaches 165° C. and this reaction temperature is held for 315 minutes. The product is recovered and dried at 100° C. under vacuum to a constant weight to provide a light tan-colored solid of the following structure:

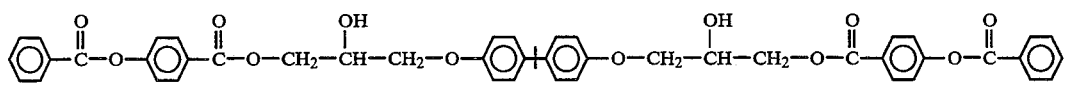

Epoxide titration reveals the product to contain 0.03 percent residual epoxide.

B. Synthesis of an Isocyanate Terminated Prepolymer Containing the Epoxy Resin Adduct (7.25 weight percent) Prepared by the Reaction of 4(4-Hydroxybenzoyl)benzoic Acid and Diglycidyl Ether of Bisphenol A A portion of the reaction product of 4(4-hydroxybenzoyl)benzoic acid and a diglycidyl ether of bisphenol A (72.54 grams, 7.25 weight percent) from A. above, a propylene glycol polypropoxylate having an average molecular weight of 2000 (217.61 grams, 21.76 weight percent), a glycerine polypropoxylate capped with 18 percent ethylene oxide having an average molecular weight of 4850 (435.22 grams, 43.52 weight percent) and 4,4'-diisocyanatodiphenyl methane (274.63 grams, 27.46 weight percent) are reacted as described in Example 1. Titration of portions of the slightly opaque, light tan colored prepolymer reveals the presence of 6.658 percent isocyanate, as compared with a theoretical isocyanate amount of 6.5 percent.

C. Preparation of Polyurethane Elastomer Casting

A portion of the isocyanate terminated prepolymer from B. above (400.1 grams) is added to an oven dried glass reactor and processed as described in Example 1. A liquid chain extender solution (161.13 grams) is injected into the reactor. The liquid chain extender solution is prepared by mixing methylenebis(orthochloroaniline) (90.23 grams), propylene glycol polypropoxylate having an average molecular weight of 2000 (54.14 grams) and glycerine polypropoxylate capped with 18 percent ethylene oxide having an average molecular weight of 4850 (81.21 grams), as described in Example 1 including use of a bismuth neodecanoate catalyst. Polyurethane elastomer castings are prepared as described in Example 1 and testing of their physical and mechanical properties is done as described therein. The results are reported in Table I.

EXAMPLE 4

A. Preparation of an Epoxy Resin Adduct by the Reaction of p-Phenylphenol and Diglycidyl Ether of Bisphenol p-Phenylphenol (170.20 grams, 1.00 hydroxyl equivalent) and a diglycidyl ether of bisphenol A (181.09 grams, 1.00 epoxide equivalent) having an epoxide equivalent weight (EEW) of 181.09 are used to prepare an epoxy resin adduct by the method shown in Example 1, except that the reaction time at 175° C. is increased to 244 minutes. Epoxide titration reveals the product to contain 0.07 percent residual epoxide.

B. Synthesis of an Isocyanate Terminated Prepolymer Containing the Epoxy Resin Adduct (7.18 weight percent) Prepared by Reacting p-Phenylphenol and Diglycidyl Ether of Bisphenol A Plus Rodlike Mesogenic Diisocyanate

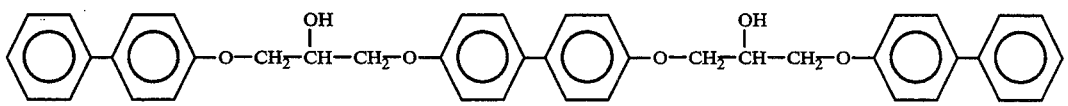

A portion of the reaction product of p-phenylphenol and diglycidyl ether of bisphenol A (71.79 grams, 7.18 weight percent) from A. above, a propylene glycol polypropoxylate having an average molecular weight of 2000 (215.37 grams, 21.54 weight percent), a glycerine polypropoxylate capped with 18 percent ethylene oxide having an average molecular weight of 4850 (430.74 grams, 43.07 weight percent), 3,3'-dimethyl-4,4'-diisocyanatodiphenyl (70.53 grams, 7.05 percent) and 4,4'-diisocyanatodiphenyl methane (211.58 grams, 21.26 weight percent) are reacted as described in Example 1. Titration of portions of the transparent, colorless prepolymer reveals the presence of 6.738 percent isocyanate, as compared with a theoretical isocyanate amount of 6.5 percent.

C. Preparation of Polyurethane Elastomer Casting

A portion of the isocyanate terminated prepolymer from B. above (400.1 grams) is added to an oven dried glass reactor and processed as described in Example 1. A liquid chain extender solution (163.06 grams) is injected into the reactor. The liquid chain extender solution is prepared by mixing methylenebis(ortho-chloroaniline) (91.31 grams), propylene glycol polypropoxylate having an average molecular weight of 2000 (54.79 grams) and glycerine polypropoxylate capped with 18 percent ethylene oxide having an average molecular weight of 4850 (82.18 grams) as described in Example 1 including use of bismuth neodecanoate catalyst. Polyurethane elastomer castings are prepared as described in Example 1 and testing of their physical and mechanical properties is done as described therein. The results are reported in Table I.

EXAMPLE 5

A. Preparation of an Epoxy Resin Adduct by the Reaction of p-Phenylphenol and Diglycidyl Ether of 4,4'-Dihydroxybiphenyl A diglycidyl ether of 4,4'-dihydroxybiphenyl (65.85 grams, 0.40 epoxide equivalent) having an epoxide equivalent weight (EEW) of 164.60, p-phenylphenol (68.08 grams, 0.40 hydroxyl equivalent) and methylamyl ketone (75.0 grams) are added to a reactor and heated with stirring under a nitrogen atmosphere. Once a 90° C. reaction temperature is achieved, ethyltriphenylphosphonium acetate.acetic acid complex (70 percent by weight in methanol) (0.134 gram, 0.10 percent weight) is added to the reactor and heating is continued. After 10 minutes, the reaction temperature reaches 165° C. and a clear solution is observed. After 93 minutes at 165° C., the thick white slurry which is formed is diluted with additional methylamyl ketone (75.0 grams). The reaction is continued at 160° C. as controlled by refluxing of methylamyl ketone solvent. After 60 minutes at 160° C., the product slurry is recovered and allowed to cool to a solid mass. After drying in a vacuum oven at 110° C. for 24 hours, the product is recovered as a white solid (133.0 grams) of the following structure:

Epoxide titration reveals the product to be free of residual epoxide. Gel permeation chromatographic analysis using glycerin polypropoxylates as calibration standards reveals a weight average molecular weight of 419 for the product, excluding a pair of minor shoulder peaks in the molecular weight calculation.

B. Evaluation of Liquid Crystallinity in the Epoxy Resin Adduct

A portion (0.0639 gram, 0.0002 hydroxyl equivalent) of the reaction product from A. above is dissolved in 1,4-dioxane (3.5 milliliters) then phenyl isocyanate (0.0298 gram, 0.00025 mole) is added and the solution held at 80° C. under a dry nitrogen atmosphere for 48 hours. After this time a hazy reaction mixture is recovered and the solvent is removed under vacuum and at a temperature of 80° C. for 24 hours. The resulting urethane of the p-phenylphenol and diglycidyl ether of 4,4'-dihydroxybiphenyl reaction product is recovered as a white crystalline solid. Optical microscopy under crosspolarized light of a portion of the urethane using a microscope equipped with a programmable hot stage is completed using a heating rate of 10° C. per minute and a range of 30° C. to 210° C. A melt temperature ($T_m$) of 180° C. is observed followed by isotropization ($T_i$) at 199.6° C. Cooling of the sample followed by a repeat of the aforementioned heating cycle replicates the observed $T_m$ and $T_i$ values. Stirring of the sample as it cools from $T_i$ induces observable opalescence. Differential scanning calorimetry of a portion of the urethane using a heating rate of 20° C. per minute and a range of 30° C. to 190° C. reveals a single endotherm at 180° C. Cooling of the sample followed by a second heating cycle at a rate of 5° C. per minute and a range of 30 to 200° C. reveals the following sequence of $T_m$ to liquid crystal to $T_i$ transitions:

| Event | Temperature (°C.) | Enthalpy (Kcal/mole) |
|---|---|---|
| Endotherm | 185.8 | 8.18 |
| Endotherm | 189.0 | 1.68 |

Deconvolution is used to resolve the enthalpies associated with the above thermal transitions. Cooling of the sample at a rate of 5° C. per minute and at a range of 200° C. to 140° C. reveals exothermic transitions at 155.4° C. and 152.2° C. which are not well enough resolved for measurement of the respective enthalpies. Cooling of the sample followed by a repeat of the conditions used for the second heating cycle generally reproduces the previously observed endotherms but overall enthalpy is decreased due to thermally induced decomposition of the urethane.

C. Propoxylation of the Epoxy Resin Adduct Prepared by the Reaction of p-Phenylphenol and the Diglycidyl Ether of 4,4'-Dihydroxybiphenyl A portion of the epoxy resin adduct (65.0 grams, 0.20 hydroxyl equivalent) from A. above, propylene oxide (35.47 grams, 0.61 mole), 1,4-dioxane (35.47 grams) and potassium hydroxide (0.10 gram, 1000 ppm) are added to a thick walled, preweighed, glass reactor which is then sealed and placed into a rotating steam heated autoclave. The autoclave is heated to 120° C. and held at this reaction temperature for 34 hours, after which time te recovered product weight is determined to be 85.65 grams (excluding KOH catalyst). The product is recovered by dissolution in chloroform (200 milliliters). The chloroform solution is added to a separatory funnel and washed with deionized water (75 milliliters). The recovered chloroform extract is filtered through a bed of anhydrous sodium sulfate followed by rotary evaporation of the dry filtrate under vacuum at 120° C. for 60 minutes. The propoxylate of the reaction product of p-phenylphenol and the diglycidyl ether of 4,4'-dihydroxybiphenyl is recovered as a tacky, transparent, light yellow colored solid (83.35 grams). Theoretical calculation (based on theoretical hydroxyl content in the reaction product precursor and mass balance of the propoxylation) indicates that the addition of 1.74 propylene oxide units per hydroxyl group contained in the reaction product precursor has occurred. Gel permeation chromatographic analysis using glycerine polypropoxylates as calibration standards revealed a weight average molecular weight of 529 for the product, excluding a pair of minor shoulder peaks in the molecular weight calculation.

D. Synthesis of an Isocyanate Terminated Prepolymer Containing the Propoxylate of the Epoxy Resin Adduct (11.72 weight percent)

A portion of the propoxylate of the reaction product of p-phenylphenol and the diglycidyl ether of 4,4'-dihydroxybiphenyl (76.18 grams, 11.72 weight percent) from C. above, a propylene glycol polypropoxylate having an average molecular weight of 2000 (110.69 grams, 17.03 weight percent), a glycerine polypropoxylate capped with 18 percent ethylene oxide having an average molecular weight 4850 (280.30 grams, 43.12 weight percent) and 4,4'-diisocyanatodiphenyl methane (182.84 grams, 28.13 weight percent) are reacted as described in Example 1. Titration of portions of the transparent, light yellow colored prepolymer reveals the presence of 6.44 percent isocyanate, as compared with a theoretical isocyanate amount of 6.5 percent.

E. Preparation of Polyurethane Elastomer Casting

A portion of the isocyanate terminated prepolymer (400.1 grams) from D. above is added to an oven dried glass reactor and processed as described in Example 1. A liquid chain extender (155.73 grams) is injected into the reactor. The liquid chain extender solution is prepared by mixing methylenebis(ortho-chloroaniline) (87.21 grams), propylene glycol polypropoxylate having an average molecular weight of 2000 (52.33 grams) and glycerine polypropoxylate capped with 18 percent ethylene oxide having an average molecular weight of 4850 (78.49 grams) as described in Example 1 including use of a bismuth neodecanoate catalyst. Polyurethane elastomer castings are prepared as described in Example 1 and testing of their physical and mechanical properties is done as described therein. The results are reported in Table I.

EXAMPLE 6—COMPARATIVE (Not an example of the present invention)

A. Synthesis of a Standard Isocyanate Terminated Prepolymer Containing No Epoxy Resin Adduct A portion of a propylene glycol polypropoxylate having an average molecular weight of 2000 (294.86 grams, 29.49 weight percent), a glycerine polyproxylate capped with 18 percent ethylene oxide having an average molecular weight of 4850 (442.28 grams, 44.23 weight percent) and 4,4'-diisocyanatodiphenyl methane (262.86 grams, 26.29 weight percent) are added to an oven dried glass reactor and heated with stirring to 80° C. under a dry nitrogen atmosphere. After two hours of reaction at the 80° C. temperature the transparent, colorless prepolymer liquid is recovered as a homogeneous solution and stored in a metal can under a dry nitrogen atmosphere. Twenty-two hours later titration of portions of the prepolymer reveals the presence of 6.685 percent isocyanate, as compared with a theoretical isocyanate amount of 6.5 percent.

B. Preparation of Polyurethane Elastomer Casting

A portion of the isocyanate terminated prepolymer (400.1 grams) from A. above is added to an oven dried glass reactor as described in Example 1. A liquid chain extender (161.76 grams) is injected into the reactor. The liquid chain extender solution is prepared by mixing methylenebis(orthochloroaniline) (90.58 grams), propylene glycol polypropoxylate having an average molecular weight of 2000 (54.35 grams) and glycerine polypropoxylate capped with 18 percent ethylene oxide having an average molecular weight of 4850 (81.52 grams) as described in Example 1 including use of a bismuth neodecanoate catalyst. Polyurethane elastomer castings are prepared as described in Example 1 and testing of their physical and mechanical properties is done as described therein. The results are reported in Table I.

TABLE I

| Property Tested | Example 1 | Example 2 | Example 3 | Example 4 | Example 5 | Example 6-Comparative |
|---|---|---|---|---|---|---|
| Specific Gravity | 1.1025 | 1.1455 | 1.0960 | 1.1255 | 1.1391 | 1.1186 |
| Shore A Hardness | 85 | >90 (Shore D = 41) | 84 | 88 | 85 | 85 |
| Bashore Rebound (%) | 36 | 33 | 40 | 39 | 35 | 44 |
| Die C Tear (lb./in.) | 274 (6.5) | 311 (5.2) | 253 (21.9) | 326 (12.1) | 288 (6.0) | 252 (15.3) |

TABLE I-continued

| Property Tested | Example 1 | Example 2 | Example 3 | Example 4 | Example 5 | Example 6-Comparative |
|---|---|---|---|---|---|---|
| Split Tear (lb./in.) | 78 (2.7) | 126 (15.7) | 75 (8.9) | 123 (13.8) | 65 (3.6) | 73 (8.2) |
| Water Absorption | | | | | | |
| regular (%) | 2.69 (.06) | 2.61 (.09) | 2.81 (.01) | 2.97 (.03) | 2.25 (.01) | 3.42 (.01) |
| predried (%) | NA | 2.80 (.02) | 3.28 (.02) | 3.01 (.03) | 2.92 (.02) | 3.53 (.03) |
| Compression Set, Method B, 25° C./25% | 2.30 | 3.82 | 3.08 | 1.90 | 3.90 | 2.87 |
| Flexural Modulus (psi) | 7233 (173) | 8535 (171) | 6046 (107) | 8519 (93) | 7119 (127) | 7326 (90) |
| Tensile Properties: | | | | | | |
| Final Strain (%) | 361 (34) | 259 (9) | 325 (16) | 415 (25) | 280 (21) | 313 (54) |
| Final Stress (psi) | 2880 (186) | 3646 (117) | 2512 (194) | 3552 (138) | 2702 (188) | 1891 (224) |
| Stress (psi) at set strain: | | | | | | |
| 5% | 363 (13) | 493 (41) | 309 (12) | 408 (13) | 361 (18) | 376 (13) |
| 50% | 778 (10) | 1065 (25) | 748 (7) | 849 (7) | 858 (17) | 733 (9) |
| 100% | 1018 (23) | 1456 (32) | 1004 (14) | 1137 (14) | 1171 (36) | 939 (15) |
| 200% | 1552 (67) | 2549 (66) | 1557 (29) | 1695 (31) | 1927 (99) | 1333 (39) |

*Parenthetical ( ) values designate the standard deviation.

EXAMPLE 7

Dynamic Mechanical Thermal Analysis of Polyurethane Elastomer Castings

Portions (1.75 by 0.5 by 0.1 inch) of the elastomer castings of Examples 2 and 4 and Comparative Example 6 are subjected to dynamic mechanical thermal analysis (DMTA) using a Polymer Labs instrument in the three point bending mode. A 4° C. per minute rate of heatup is employed with a temperature range of $-100°$ C. to 200° C. The deformation frequency used is one Hertz. Storage modulus (E') values thus determined are given in Table II as a function of selected temperatures. The temperatures for observed tan delta transitions are also given in Table II.

TABLE II

| Sample Designation | Tan Delta Transition (°C.) | −100° C. | −50° C. | −25° C. | 0° C. | 25° C. | STORAGE MODULUS (dynes/cm² × 10⁹) 50° C. | 100° C. | 150° C. | 200° C. |
|---|---|---|---|---|---|---|---|---|---|---|
| Example 2 | −16° C. (shoulder), 8° C. | 16.1 | 14.7 | 9.3 | 2.1 | .56 | .28 | .10 | .05 | .15 |
| Example 4 | −27° C., 132° C. | 24.3 | 28.8 | 7.1 | 1.3 | .54 | .32 | .12 | .09 | .11 |
| Comparative Example 6 | −30° C., 159° C. | 21.4 | 21.4 | 1.9 | .65 | .37 | .27 | .16 | .12 | .21 |

EXAMPLE 8

A. Wide Angle X-ray Scattering Analysis of Polyurethane Elastomer Castings

Two-inch by two-inch portions of the polyurethane elastomer castings of Example 2 and Example 4 and Comparative Example 6 are analyzed for wide angle X-ray scattering using an X-ray pinhole camera. Copper K alpha X-rays are pinhole collimated and projected as a 0.5 millimeter square beam onto the surface of each respective casting sample. Each respective sample is analyzed while under a tensile strain of 100 percent and then 250 percent. The reflected X-rays are collected on a piece of film located 5 centimeters above each sample. The observations made at both of the applied tensile strains are summarized in Table III wherein the term "oriented" refers to the presence of anisotropic scattering.

TABLE III

| Sample Designation | Amorphous Soft Segment Phase | Crystalline Hard Segment Phase |
|---|---|---|
| Example 2 | Amorphous peak oriented along equatorial line of film at 4.27 angstoms at 100% strain, increased orientation at 250% strain | No peak present |
| Example 4 | Amorphous peak oriented along equatorial line of film at 4.48 angstroms at 100% strain, increased orientation at 250% strain | Crystalline peak oriented along equatorial line of film at 6.07 angstroms at 100% strain, no longer visible at 250% strain |
| Comparative Example 6 | Non-oriented broad peak at 4.27 angstroms for both % strains | Crystalline peak oriented along equatorial line of film at 5.3 angstroms for both % strains |

EXAMPLE 9

RIM Processed Polyurethane Elastomer Prepared from an Epoxy Resin Adduct Prepared by the Reaction of p-Phenylphenol and Diglycidyl Ether of Bisphenol A A. Preparation of "A" Side Component A portion (414.50 grams, 20.0% by weight) of the epoxy resin adduct prepared from pophenylphenol and the diglycidyl ether of hisphenol A using the method of Example 4 (0.05% residual epoxide) and 4,4'-diisocyanatodiphenyl methane (1658.0 grams, 80.0% by weight) are added to an oven dried glass reactor and heated to a 80° C. reaction temperature with stirring under a nitrogen atmosphere. After 60 minutes at the 80° C. reaction temperature, the solution (2065.5 grams) is diluted with carbodiimide modified 4,4'-diisocyanatodiphenyl methane (available from The Dow Chemical Co. as ISONATE* 143L) (1377.0 grams, 40% by weight) and the resultant light yellow colored prepolymer solution is recovered and stored under nitrogen. Titration of a portion of the blended isocyanate prepolymer solution reveals the presence of 26.64 percent isocyanate, as compared with a theoretical isocyanate amount of 26.2 percent.

B. Preparation of "B" Side Component

Ethylene glycol (700.0 grams, 83.3% by weight) and urea (140.0 grams, 16.7% by weight) are combined and stirred with heating to 50° C. to provide a solution. The ethylene glycol/urea solution is added to a glycerine polypropoxylate (prepared by capping a 3970 average molecular weight glycerine polypropoxylate with 19.6 percent ethylene oxide to a 1630.8 hydroxyl equivalent weight) (4666.67 grams) to give a solution with a 216.7 hydroxyl equivalent weight. Immediately prior to use in the preparation of a RIM processed elastomer, the "B" side solution is catalyzed by mixing in 0.2% by weight dibutyltin dilaureate.

C. Preparation of RIM Processed Polyurethane Elastomer

The "A" side and "B" side components are loaded into the respective reservoirs of a reactive injection molding (RIM) machine (Hi Tech Mini RIM, Hi Tech Engineering, Inc., Grand Rapids, Michigan, Machine No. 2012) and heated to 110° F. The metal mold for making 6 inch by 6 inch by 1/10 inch plaques is preheated to 160° F. A 30 second demold time is used followed by postcuring of the plaques for 60 minutes at 250° F. The "B" side to "A" side ratio is 1.349 with an isocyanate index of 1.02. The physical and mechanical properties of the plaques is evaluated using the methods of Example 1. The results are reported in Table IV.

EXAMPLE 10 - Comparative (Not an example of the present invention)

RIM Processed Polyurethane Elastomer Prepared without an Epoxy Resin Adduct

A. Preparation of "A" Side Component

Dipropylene glycol (92.05 grams, 6.0% by weight), tripropylene glycol (92.05 grams, 6.0% by weight) and 4,4'-diisocyanatodiphenyl methane (1350.0 grams, 88% by weight) are added to an oven dried glass reactor and heated to a 80° C. reaction temperature with stirring under a nitrogen atmosphere. After 60 minutes at the 80° C. reaction temperature, the prepolymer solution (1525.3 grams) is diluted with carbodiimide modified 4,4'-diisocyanatodiphenyl methane (available from The Dow Chemical Co. as Isonate* 143L) (1016.87 grams, 40% by weight) and the resultant light amber colored solution is recovered and stored under nitrogen. Titration of a portion of the blended isocyanate prepolymer solution reveals the presence of 25.29 percent isocyanate, as compared with a theoretical isocyanate amount of 25.3 percent.

B. Preparation of RIM Processed Polyurethane Elastomer

The "A" side component described above and the "B" side component described in Example 9 are used to prepare reactive injection molded plaques according to the method of Example 9, except the "B" side to "A" side ratio is 1,282. The resultant plaques are evaluated for physical and mechanical properties using the method of Example 1. The results are given in Table IV.

TABLE IV

| | Sample Designation | | |
|---|---|---|---|
| Property Tested* | Example 9 | Example 10-Comparative | Example 11 |
| Specific Gravity | 0.9596 | 0.9810 | 1.0180 |
| Shore A Hardness | 92 | 90 | 91 |
| Shore D Hardness | 43 | 40 | 50 |
| Bashore Rebound (%) | 34 | 35 | 36 |
| Die C Tear Strength (lb./in.) | 436 [6.2] | 332 [6.5] | 472 [1.1] |
| Split Tear Strength (lb/in.) | 160 [7.5] | 113 [8.7] | 174 [2.1] |
| Compression Set., Method B, 25° C./25% | 4.63 | 3.47 | 3.69 |
| Flexural Modulus (psi) | 14,428 [247] | 10,215 [369] | 7743 [113] |
| Tensile Properties: Final Strain (%) | 293 [10] | 252 [11] | 290 [15] |
| Final Stress (psi) | 3225 [156] | 2818 [238] | 2999 [188] |
| Stress (psi) at set strain: | | | |
| 5% | 516 [33] | 244 [36] | 325 [12] |
| 50% | 1258 ]14] | 1094 [55] | 1155 [13] |
| 100% | 1645 [19] | 1514 [76] | 1587 [14] |
| 200% | 2440 [22] | 2360 [118] | 2302 [21] |
| Percent Hard Segment[1] | 44.4 | 45.3 | 41.1 |

*[ ]values designate the standard deviation.
[1]Weight ethylene glycol + weight diisocyanate reacting with ethylene glycol divided by total weight.

EXAMPLE 11

RIM Processed Polyurethane Elastomer Containing an Epoxy Resin Adduct Prepared by the Reaction of p-Phenylphenol and Diglycidyl Ether of Bisphenol A Plus a Rodlike Mesogenic Diisocyanate A. Preparation of "A" Side Component 4,4'-diisocyanatodiphenyl methane (1800.0 grams, 90.0% by weight) and 3,3'-dimethyl-4,4'-diisocyanatodiphenyl (200.0 grams, 10.0% by weight) are added to an oven dried glass reactor and heated to 100° C. with stirring under a nitrogen atmosphere. The heated mixture is diluted with carbodiimide modified 4,4'-diisocyanatodiphenyl methane (1333.33 grams, 40% by weight of the total solution), then stirred under the nitrogen atmosphere with heating until the 100° C. temperature is reached again. The resultant light yellow colored solution is recovered and stored under nitrogen. Titration of a portion of the blended isocyanate solution reveals the presence of 32.03 percent isocyanate, as compared with a theoretical isocyanate amount of 31.76 percent.

B. Preparation of "B" Side Component

Ethylene glycol (450.0 grams, 83.3% by weight) and urea (90.0 grams, 16.7% by weight) are combined and stirred with heating to 50° C. The ethylene glycol/urea solution is added to glycerine polypropoxylate (prepared by capping a 3970 average molecular weight glycerine polypropoxylate with 19.6 percent ethylene oxide to a 1630.8 hydroxyl equivalent weight) (2850.0 grams). A portion (150.0 grams, 4.24% by weight of the total solution) of the epoxy resin adduct of Example 4 (0.05% residual epoxide) is ground to a powder then added to the polyol/ethylene glycol/urea solution. The solution is heated under a nitrogen atmosphere with stirring to form a solution with a 217.01 hydroxyl equivalent weight and a density of 1.0481 at 25° C. Immediately prior to use in the preparation of a RIM processed elastomer, the "B" side solution is catalyzed by mixing in 0.2% by weight dibutyltin dilaureate.

C. Preparation of RIM Processed Polyurethane Elastomer

The "A" and "B" side components are loaded into the respective reservoirs of a reactive injection molding (RIM) machine using the method and conditions of Example 9. The "B" side to "A" side ratio is 1.622 with an isocyanate index of 1.02. The physical and mechanical properties of the plaques are evaluated using the methods of Example 1. The results are reported in Table IV.

EXAMPLE 12

A. Synthesis of an Isocyanate Terminated Prepolymer Containing the Epoxy Resin Adduct (6.88 weight percent) Prepared by Reacting p-Phenylphenol and Diglycidyl Ether of Bisphenol A Plus a Rodlike Mesogenic Diisocyanate (3.90 weight percent) and Poly(tetramethylene glycol) as the Polyol A portion of an epoxy resin adduct prepared by reacting p-Phenylphenol and the diglycidyl ether of bisphenol A (68.79 grams, 6.88 weight percent), according to the method of Example 1, (0.01% residual epoxide), poly(tetramethylene glycol) having a hydroxyl equivalent weight of 1013.11 (619.13 grams, 61.91 weight percent), 3,3'-dimethyl-4,4'-diisocyanatodiphenyl (39.01 grams, 3.90 weight percent) and 4,4'-diisocyanatodiphenyl methane (273.07 grams, 27.31 weight percent) are added to an oven dried glass reactor and heated with stirring to 80° C. under a dry nitrogen atmosphere. After three hours of reaction at the 80° C. temperature, the transparent prepolymer liquid is recovered as a homogeneous solution and stored in a metal can under a dry nitrogen atmosphere. Twenty four hours later, titration of portions of the prepolymer reveals the presence of 7.13 percent isocyanate, as compared with a theoretical isocyanate amount of 7.0 percent.

B. Preparation of Polyurethane Elastomer Casting

A portion of the isocyanate terminated prepolymer (399.3 grams) from A. is added to an oven dried glass reactor and heated with stirring to 50° C. prepolymer under a vacuum of 1 millimeter of Hg or less. After 2 hours the prepolymer was cooled to 24° C., stirring was stopped, the vacuum was released, then 179.93 grams of a liquid chain extender solution is injected into the reactor. The liquid chain extender solution is prepared by mixing methylenebis(ortho-chloroaniline) (71.97 grams) and poly(tetramethylene glycol) having a hydroxyl equivalent weight of 1013.11 (107.96 grams) at 110° C. with stirring for 20 minutes, followed by degassing at 65° C. under vacuum for 60 minutes. Polyurethane elastomer castings are prepared as described in Example 1 including use of a bismuth neodecanoate catalyst and testing of their physical and mechanical properties is done as described therein. The results are reported in Table V.

EXAMPLE 13

A. Synthesis of an Isocyanate Terminated Prepolymer Containing the Epoxy Resin Adduct (6.86 weight percent) Prepared by Reacting of p-Phenylphenol and Diglycidyl Ether of Bisphenol A Plus a Rodlike Mesogenic Diisocyanate (7.85 weight percent) and Poly(tetramethylene glycol) as the Polyol A portion of a reaction product of p-phenylphenol and the diglycidyl ether of bisphenol A (68.61 grams, 6.86 weight percent) prepared using the method of Example 1, (0.01% residual epoxide), poly(tetramethylene glycol) having a hydroxyl equivalent weight of 1013.11 (617.47 grams, 61.75 weight percent), 3,3'-dimethyl-4,4'-diisocyanatodiphenyl (78.48 grams, 7.85 weight percent) and 4,4'-diisocyanatodiphenyl methane (235.44 grams, 23.54 weight percent) are used to prepare a prepolymer as described in Example 12. Titration of portions of the transparent prepolymer revealed the presence of 6.97 percent isocyanate, as compared with a theoretical isocyanate amount of 7.0 percent.

B. Preparation of Polyurethane Elastomer Casting

A portion of the isocyanate terminated prepolymer (400.1 grams) from A. above is used to prepare a polyurethane elastomer casting as described in Example 12. A liquid chain extender solution (176.18 grams) is injected into the reactor. The liquid chain extender solution is prepared by mixing methylenebis(ortho-chloroaniline) (70.47 grams) and poly(tetramethylene glycol) having a hydroxyl equivalent weight of 1013.11 (105.71 grams) at 110° C. with stirring for 20 minutes followed by degassing at 65° C. under vacuum for 60 minutes. Polyurethane elastomer castings are prepared as described in Example 1 including use of a bismuth neodecanoate catalyst and testing of their physical and mechanical properties is done as described therein. The results are reported in Table V.

EXAMPLE 14

A. Synthesis of an Isocyanate Terminated Prepolymer Containing the Epoxy Resin Adduct (13.44 weight percent) Prepared by Reacting p-Phenylphenol and the Diglycidyl Ether of Bisphenol A Plus a Rodlike Mesogenic Diisocyanate (8.21 weight percent) and Poly(tetramethylene glycol) as the Polyol A portion of the reaction product of p-phenylphenol and the diglycidyl ether of bisphenol A (134.36 grams, 13.44 weight percent) prepared using the method of Example 1, (0.01% residual epoxide), poly(tetramethylene glycol having a hydroxyl equivalent weight of 1013.11 (537.46 grams, 53.75 weight percent), 3,3'-dimethyl-4,4'-diisocyanatodiphenyl (82.05 grams, 8.21 weight percent) and 4,4'-diisocyanatodiphenyl methane (246.14 grams, 24.61 weight percent) are used to prepare a prepolymer as described in Example 12. Titration of portions of the prepolymer revealed the presence of 6.99 percent isocyanate, as compared with a theoretical isocyanate amount of 7.0 percent.

B. Preparation of Polyurethane Elastomer Casting

A portion of the isocyanate terminated prepolymer (400.0 grams) from A. above is used to prepare a polyurethane elastomer casting as described in Example 12. A liquid chain extender solution (176.76 grams) is injected into the reactor. The liquid chain extender solution is prepared by mixing methylenebis(ortho-chloroaniline) (70.70 grams) and poly(tetramethylene glycol) having a hydroxyl equivalent weight of 1013.11 (106.06 grams) as described in Example 13. Polyurethane elastomer castings are prepared as described in Example 1 including use of a bismuth neodecanoate catalyst and testing of their physical and mechanical properties is done as described therein. The results are reported in Table V.

EXAMPLE 15 - COMPARATIVE (Not an example of the present invention)

A. Synthesis of an Isocyanate Terminated Pre- polymer Containing Poly(tetramethylene glycol) as the Polyol Without Using an Epoxy Resin Adduct Poly(tetramethylene glycol) having a hydroxyl equivalent weight of 1013.11 (704.52 grams, 70.45 weight percent) and 4,4'--diisocyanatodiphenyl methane (295.48 grams, 29.55 weight percent) are added to an oven dried glass reactor and heated with stirring to 80° C. under a dry nitrogen atmosphere. After three hours of reaction at the 80° C. temperature, the transparent prepolymer liquid is recovered as a homogeneous solution and stored in a metal can under a dry nitrogen atmosphere. Titration of portions of the prepolymer reveals the presence of 7.02 percent isocyanate, as compared with a theoretical isocyanate amount of 7.0 percent.

B. Preparation of a Standard Polyurethane Elastomer Casting

A portion of the isocyanate terminated prepolymer (400.7 grams) from A. above is used to prepare polyurethane elastomer castings as described in Example 12. A liquid chain extender solution (177.69 grams) is injected into the reactor. The liquid chain extender solution is prepared by mixing methylenebis(ortho-chloroaniline) (71.08 grams) and poly(tetramethylene glycol) having a hydroxyl equivalent weight of 1013.11 (106.61 grams) as described in Example 13. Polyurethane elastomer castings are prepared as described in Example 1 including use of a bismuth neodecanoate catalyst and testing of their physical and mechanical properties is done as described therein. The results are reported in Table V.

EXAMPLE 16 - COMPARATIVE (Not an example of the present invention)

A. Synthesis of an Isocyanate Terminated Prepolymer Prepared from a Poly(tetramethylene glycol) Blend (1013.11 and 303.59 hydroxyl equivalent weights) Without Using an Epoxy Resin Adduct Poly(tetramethylene glycol) having a hydroxyl equivalent weight of 1013.11 (628.07 grams, 62.81 weight percent), poly(tetramethylene glycol) having a hydroxyl equivalent weight of 303.59 (60.83 grams, 6.08 weight percent) and 4,4'-diisocyanatodiphenyl methane (311.10 grams, 31.11 weight percent) are added to an oven dried glass reactor and heated with stirring to 80° C. under a dry nitrogen atmosphere. After three hours of reaction at the 80° C. temperature, the transparent prepolymer liquid was recovered as a homogeneous solution and stored in a metal can under a dry nitrogen atmosphere. Twenty four hours later, titration of portions of the prepolymer revealed the presence of 7.02 percent isocyanate, as compared with a theoretical isocyanate amount of 7.0 percent.

B. Preparation of a Polyurethane Elastomer Casting

A portion of the isocyanate terminated prepolymer (400.1 grams) from A. above is used to prepare a polyurethane elastomer casting as described in Example 12. A liquid chain extender is injected into the reactor (177.59 grams). The liquid chain extender is prepared by mixing methylenebis(orthochloroaniline) (71.04 grams) and poly(tetramethylene glycol) having a hydroxyl equivalent weight of 1013.11 (106.55 grams) as described in Example 13. Polyurethane elastomer castings are prepared as described in Example 1 including use of a bismuth neodecanoate catalyst and testing of their physical and mechanical properties is done as described therein. The results are reported in Table V.

EXAMPLE 17 - COMPARATIVE (Not an example of the present invention)

A. Synthesis of an lsocyanate Terminated Prepolymer Prepared from Poly(tetramethylene glycol) as the Polyol and a Rodlike Mesogenic Diisocyanate (5.18 weight percent), Without Using an Epoxy Resin Adduct Poly(tetramethylene glycol) having a hydroxyl equivalent weight of 1013.11 (700.94 grams, 70.09 weight percent), 3,3'-dimethyl-4,4'-diisocyanatodiphenyl (74.77 grams, 7.48 weight percent) and 4,4'-diisocyanatodiphenyl methane (224.30 grams, 22.43 weight percent) are added to an oven dried glass reactor and processed as described in Example 16. Titration of portions of the slightly hazy prepolymer reveals the presence of 7.03 percent isocyanate, as compared with a theoretical isocyanate amount of 7.0 percent.

B. Preparation of Polyurethane Elastomer Casting

A portion of the isocyanate terminated prepolymer (400.0 grams) from A. above is used to prepare a polyurethane elastomer casting as described in Example 12. A liquid chain extender (177.76 grams) is injected into the reactor. The liquid chain extender is prepared by mixing methylenebis(orthochloroaniline) (71.10 grams) and poly(tetramethylene glycol) having a hydroxyl equivalent weight of 1013.11 (106.65 grams) as described in Example 13. Polyurethane elastomer castings are prepared as described in Example 1 including use of a bismuth neodecanoate catalyst and testing of their physical and mechanical properties is done as described therein. The results are reported in Table V.

TABLE V

| Property Tested* | Example | | | Comparative Example | | |
|---|---|---|---|---|---|---|
| | 12 | 13 | 14 | 15 | 16 | 17 |
| Specific | 1.0895 | 1.0981 | 1.1129 | 1.0843 | 1.0918 | 1.0631 |

TABLE V-continued

| Property Tested* | Example 12 | Example 13 | Example 14 | Comparative Example 15 | Comparative Example 16 | Comparative Example 17 |
|---|---|---|---|---|---|---|
| Gravity Shore A Hardness | 91 | 89 | 94 | 86 | 89 | 88 |
| Bashore Rebound (%) | 45 | 46 | 42 | 49 | 46 | 45 |
| Die C Tear (lb./in.) | 505 [9.9] | 510 [6.9] | 529 [5.7] | 507 [6.7] | 478 [15.3] | 491 [6.7] |
| Split Tear (lb./in.) | 157 [3.3] | 195 [18.7] | 252 [3.3] | 150 [21.9] | 157 [6.7] | 153 [5.1] |
| Water Absorption Regular (%) | 1.28 [0.05] | 1.14 [0.09] | 1.01 [0.01] | 1.19 [0.01] | 1.34 [0.04] | 1.60 [0.02] |
| Predried (%) | 1.59 [0.04] | 1.55 [0.01] | 1.11 [0.04] | 1.62 [0.02] | 1.71 [0.01] | 1.67 [0.00] |
| Compression Set, Method B 25° C./25% | 5.99 | 7.54 | 3.32 | 4.15 | 4.28 | 3.60 |
| Flexural Modulus (psi) | 12,392 [649] | 13,346 [342] | 16,494 [272] | 12,721 [475] | 12,430 [444] | 10,822 [134] |
| Tensile Properties Final Strain (%) | 615 [41] | 637 [56] | 458 [6] | 615 [113] | 622 [41] | 609 [11] |
| Final Stress (psi) | 5907 [405] | 5564 [264] | 5047 [128] | 3933 [517] | 4154 [290] | 3967 [174] |
| Stress (psi) at set strain: | | | | | | |
| 5% | 660 [60] | 563 [19] | 786 [21] | 571 [29] | 589 [45] | 402 [39] |
| 50% | 1066 [78] | 1056 [63] | 1151 [19] | 982 [48] | 1014 [19] | 825 [8] |
| 100% | 1283 [107] | 1266 [84] | 1427 [28] | 1182 [68] | 1208 [35] | 1013 [8] |
| 200% | 1796 [166] | 1726 [133] | 2116 [79] | 1527 [131] | 1537 [62] | 1351 [18] |
| 300% | 2747 [392] | 2648 [227] | 3761 [222] | 2079 [295] | 2103 [120] | 1852 [12] |
| Percent Hard Segment[1] | 18.21 | 18.09 | 18.12 | 18.07 | 18.07 | 18.17 |

*Bracketed, [ ], values designate the standard deviation.
[1] weight methylenebis(ortho-chloroaniline) + weight diisocyanates(s) reacting with methylenebis(ortho-chloroaniline) divided by total weight.

EXAMPLE 18

Abrasion Resistance Testing of Polyurethane Elastomers

Portions of the polyurethane elastomer castings from Example 13 and Comparative Example 16 are evaluated for resistance to Taber abrasion using a Teledyne Taber Dual Abraser (Model 505) with standard methods (ASTM D 1044). Testing is completed using a H-18 wheel and 1000 cycles. The results are reported in Table VI.

TABLE VI

| Designation of Sample | Loss/100 Cycles (mg) | Weight loss as percent of original weight |
|---|---|---|
| Example 13 | 20.0 | 0.0925 |
| Comparative Example 16 | 63.5 | 0.2756 |

EXAMPLE 19

A. Synthesis of an Isocyanate Terminated Prepolymer Containing an Epoxy Resin Adduct (6.17 weight percent) Prepared by Reacting p-Phenylphenol and Diglycidyl Ether of Bisphenol A A portion of the reaction product of p-phenylphenol and the diglycidyl ether of bisphenol A (61.73 grams, 6.17 weight percent) prepared using the method of Example 4 (0.05% residual epoxide, 4.9% hydroxyl), a block copolymer of polyethylene glycol with 1,2-butylene oxide having a hydroxyl equivalent weight of 899 (555.55 grams, 55.56 weight percent) and 4,4'-diisocyanatodiphenyl methane (382.72 grams, 38.27 weight percent) are added to an oven dried glass reactor and heated with stirring to 80° C. under a dry nitrogen atmosphere. The block copolymer of polyethylene glycol and 1,2-butylene oxide used herein is prepared via copolymerization of 1000 weight average molecular weight polyethylene glycol as a partial potassium alkoxide with 1,2-butylene oxide to a 1798 weight average molecular weight, followed by neutralization and removal of salt. After three hours at 80° C. the transparent, light yellow colored prepolymer is recovered as a homogeneous liquid and stored in a metal can under a dry nitrogen atmosphere. Twenty four hours later, titration of portions of the prepolymer reveals the presence of 9.56 percent isocyanate, as compared with a theoretical isocyanate amount of 9.5 percent.

B. Preparation of Polyurethane Elastomer Casting

A portion of the isocyanate terminated prepolymer from B. above (400.0 grams) is used to prepare a polyurethane elastomer casting as described in Example 12. A liquid chain extender solution (236.73 grams) is injected into the reactor. The liquid chain extender solution is prepared by mixing methylenebis(ortho-chloroaniline) (94.69 grams) and a block copolymer of polyethylene glycol and 1,2-butylene oxide (899 HEW) (142.04 grams) at 110° C. for twenty minutes, followed by degassing under vacuum at 50° C. for sixty minutes. Polyurethane elastomer castings are prepared as described in Example 1 including use of a bismuth neodecanoate catalyst and testing of their physical and mechanical properties is done as described therein. The results are reported in Table VII.

EXAMPLE 20

A. Synthesis of an Isocyanate Terminated Prepolymer Containing the Epoxy Resin Adduct (6.13 weight percent) Prepared by the Reaction of p-Phenylphenol and Diglycidyl Ether of Bisphenol A Plus Rodlike Mesogenic Diisocyanate (9.68 weight percent)

A portion of the reaction product of p-phenylphenol and the diglycidyl ether of bisphenol A (61.28 grams, 6.13 weight percent) prepared using the method of Example 4 (0.05% residual epoxide, 4.9% hydroxyl), the polyol used in Example 19 (551.53 grams, 55.16 weight percent), 3,3'-dimethyl4,4'-diisocyanatodiphenyl (96.80 grams, 9.68 weight percent) and 4,4'-diisocyanatodiphenyl methane (290.39 grams, 29.39 weight percent) are used to prepare a prepolymer as described in Example 19. Titration of portions of the transparent, light yellow colored prepolymer reveals the presence of 9.76 percent isocyanate, as compared with a theoretical isocyanate amount of 9.5 percent.

B. Preparation of Polyurethane Elastomer Casting

A portion of the isocyanate terminated prepolymer from A. above (400.0 grams) is used to prepare a polyurethane elastomer casting as described in Example 12. A liquid chain extender solution (241.58 grams) is injected into the reactor. The liquid chain extender solution is prepared by mixing methylenebis(ortho-chloroaniline) (96.63 grams) and block copolymer of polyethylene glycol and 1,2-butylene oxide (899 HEW) (144.95 grams) as described in Example 19. Polyurethane elastomer castings are prepared as described in Example 1 including use of a bismuth neodecanoate catalyst and testing of their physical and mechanical properties is done as described therein. The results are reported in Table VII.

EXAMPLE 21 - COMPARATIVE (Not an example of the present invention)

A. Synthesis of an Isocyanate Terminated Prepolymer Prepared Without an Epoxy Resin Adduct The polyol used in Example 19 (629.47 grams, 62.95 weight percent) and 4,4'-diisocyanatodiphenyl methane (370.53 grams, 37.05 weight percent) are used to prepare a prepolymer as described in Example 19. Titration of portions of the opaque, white prepolymer reveals the presence of 9.49 percent isocyanate, as compared with a theoretical isocyanate amount of 9.5 percent.

B. Preparation of Polyurethane Elastomer Casting

A portion of the isocyanate terminated prepolymer from A. above (400.0 grams) is used to prepare a polyurethane elastomer casting as described in Example 12. A liquid chain extender solution (235.02 grams) is injected into the reactor. The liquid chain extender solution is prepared by mixing methylenebis(ortho-chloroaniline) (94.01 grams) and block copolymer of polyethylene glycol and 1,2-butylene oxide (899 HEW) (141.01 grams), as described in Example 19. Polyurethane elastomer castings are prepared as described in Example 1 including use of a bismuth neodecanoate catalyst and testing of their physical and mechanical properties is done as described therein. The results are reported in Table VII.

TABLE VII

| Property Tested* | Sample Designation | | |
| --- | --- | --- | --- |
| | Example 19 | Example 20 | Comparative Example 21 |
| Specific Gravity | 1.1675 | 1.1651 | 1.1585 |
| Shore A Hardness | 80 | 85 | 75 |
| Bashore Rebound (%) | 20 | 29 | 18 |
| Die C Tear Strength (lb./in.) | 345 [6.7] | 344 [4.0] | 228 [2.9] |
| Split Tear Strength (lb./in.) | 116 [2.6] | 212 [15.8] | 95 [7.5] |
| Water Absorption Regular (%) | 3.92 [.04] | 11.46 [.23] | 16.03 [.05] |
| Predried (%) | 4.52 [.03] | 11.78 [.19] | 16.46 [1.01] |
| Compression Set, Method B, 25° C. | 2.93 | 3.62 | 2.82 |
| Flexural Modulus (psi) | 3210 [44] | 8774 [32] | 3165 [90] |
| Flexural Strength (psi) | 153 [2.1] | 394 [5.4] | 151 [3.8] |
| Tensile Properties: Final Strain (%) | 348 [5.6] | 438 [21] | 418 [7] |
| Final Stress (psi) | 7226 [223] | 2768 [61] | 2555 [7] |
| Modulus (psi): | | | |
| 50% | 697 [29] | 813 [19] | 437 [19] |
| 100% | 974 [25] | 1003 [18] | 566 [24] |
| 200% | 1900 [29] | 1386 [16] | 835 [37] |
| 300% | 4308 [102] | 1863 [8] | 1280 [17] |
| Percent Hard Segment | 21.98 | 22.21 | 21.93 |

*Bracketed, [ ], values designate the standard deviation.
[1]weight methylenebis(ortho-chloroaniline) + weight diisocyanates(s) reacting with methylenebis(ortho-chloroaniline) divided by total weight.

EXAMPLE 22

Accelerated Fatigue Testing of Precracked Polyurethane Elastomer Castings

Portions of the polyurethane elastomer castings of Examples 19 and 20 and Comparative Example 21 are used for accelerated fatigue testing on a MTS 810 Material Test System with controller cartridges for strain +50 percent, load +300 lbs. and displacement +5 inches. Test pieces (2.5 inches by 1 inch by 100 mils nominal) are prepared and then precracked 1/16 inch from the edge toward the center using a sharp razor blade. Test conditions included the use of a 1 inch span, 5 Hz, 250 cycles and load control at ambient temperature (21° C.). Lower and upper loads are varied systematically as shown in Table VIII for each repetitive set of 250 cycles until failure occurs. Failure is observed as crack propagation through the test piece in each test. The results are summarized in Table VIII wherein the loadings are normalized to exactly 100 mils of sample thickness.

TABLE VIII

| SAMPLE DESCRIPTION | UPPER LOAD (lbs./100 mils) | Comments |
| --- | --- | --- |
| Example 19 | 13.1 | |
| | 18.5 | |
| | 21.2 | |
| | 25.1 | |
| | 31.1 | |

TABLE VIII-continued

| SAMPLE DESCRIPTION | UPPER LOAD (lbs./100 mils) | Comments |
|---|---|---|
| | 32.3 | |
| | 35.1 | |
| | 39.1 | |
| | 44.5 | |
| | 49.5 | (partially glassy, smooth break) |
| Example 20 | 36.3 | |
| | 41.5 | |
| | 46.2 | |
| | 49.2 | |
| | 53.6 | |
| | 57.0 | |
| | 60.5 | |
| | 62.2 | |
| | 64.8 | (non-glassy, rough break) |
| Comparative Example 21 (Run 1) | 31.0 | |
| | 35.0 | |
| | 38.2 | (glassy, smooth break) |
| (Run 2) | 15.0 | |
| | 24.0 | |
| | 25.0 | |
| | 29.0 | |
| | 31.5 | |
| | 35.0 | |
| | 38.7 | (glassy, smooth break) |

EXAMPLE 23

Dynamic Mechanical Thermal Analysis of Polyurethane Elastomer Castings

Portions (1.75 by 0.5 by 0.1 inch) of the polyurethane elastomer castings of Examples 19 and 20 and Comparative Example 21 are subjected to dynamic mechanical thermal analysis (DMTA) using a Polymer Labs instrument in the three point bending mode. A 4° C. per minute rate of heatup is employed with a temperature range of −100° C. to 200° C. The deformation frequency used is one Hertz. Storage modulus (E') values thus determined are given in Table IX as a function of selected temperatures. The temperatures for observed tan delta transitions are also given in Table IX.

described in Example 19. Titration of a portion of the slightly opaque, light yellow colored prepolymer reveals the presence of 9.72 percent isocyanate, as compared with a theoretical isocyanate amount of 9.5 percent.

B. Preparation of Polyurethane Elastomer Casting

A portion of the isocyanate terminated prepolymer from A. above (400.0 grams) is used to prepare a polyurethane elastomer casting as described in Example 12. A liquid chain extender solution (240.59 grams) is injected into the reactor. The liquid chain extender solution is prepared by mixing methylenebis(ortho-chloroaniline) (96.24 grams) and the block copolymer of polyethylene glycol and 1,2-butylene oxide (899 HEW) (144.35 grams) as described in Example 18. Polyurethane elastomer castings are prepared as described in Example 1 including use of a bismuth neodecanoate catalyst and testing of their physical and mechanical properties is done as described therein. The results are reported in Table X.

TABLE X

| PROPERTY TESTED* | SAMPLE DESIGNATION Example 24 |
|---|---|
| Specific Gravity | 1.1709 |
| Shore A Hardness | 87 |
| Bashore Rebound (%) | 25 |
| Die C Tear Strength (lb./in.) | 373 (4.4) |
| Split Tear Strength (lb./in.) | 215 (11.3) |
| Water Absorption - Regular (%) | 9.03 (.16) |
| Predried (%) | 10.13 (.55) |
| Compression Set, Method B, 25° C./25% | 4.27 |
| Flexural Modulus (psi) | 10,370 (198) |
| Flexural Strength (psi) | 467 (28.5) |
| Tensile Properties: Final Strain (%) | 341 (32) |
| Final Stress (psi) | 3285 (349) |
| Modulus (psi): | |
| 50% | 935 (12) |
| 100% | 1193 (12) |
| 200% | 1825 (20) |
| 300% | 2787 (41) |
| Percent Hard Segment[1] | 22.19 |

*Parenthetical, ( ), values designate the standard deviation.
[1] weight methylenebis(ortho-chloroaniline) + weight diisocyantes(s) reacting with methylenebis(ortho-chloroaniline) divided by total weight.

TABLE IX

| Sample Designation | Tan Delta Transition (°C.) | Storage Modulus (dynes/cm² × 10⁹) | | | | | | | | |
|---|---|---|---|---|---|---|---|---|---|---|
| | | −100° C. | −50° C. | −25° C. | 0° C. | 25° C. | 50° C. | 100° C. | 150° C. | 200° C. |
| Example 19 | 18 | 7.99 | 8.80 | 8.52 | 5.84 | .30 | .11 | .09 | .08 | .08 |
| Example 20 | −2 | 7.03 | 7.26 | 7.64 | 1.52 | .53 | .33 | .25 | .23 | .14 |
| Comparative Example 21 | 3 | 8.25 | 8.15 | 7.26 | 1.25 | .17 | .11 | .09 | .09 | .09 |

EXAMPLE 24

A. Synthesis of an Isocyanate Terminated Prepolymer Containing the Epoxy Resin Adduct (9.10 weight percent) Prepared by the Reaction of p-Phenylphenol and Diglycidyl Ether of Bisphenol A Plus Rodlike Mesogenic Diisocyanate (9.83 weight percent)

A portion of the reaction product of p-phenylphenol and the diglycidyl ether of bisphenol A (91.03 grams, 9.10 weight percent) prepared using the method of Example 4 (0.05% residual epoxide, 4.9% hydroxyl), the polyol used in Example 19 (515.84 grams, 51.58 weight percent), 3,3'-dimethyl-4,4'-diisocyanatodiphenyl (98.28 grams, 9.83 weight percent) and 4,4'diisocyanatodiphenyl methane (294.85 grams, 29.49 weight percent) are used to prepare a prepolymer as

EXAMPLE 25

A. Synthesis of an Isocyanate Terminated Prepolymer Containing the Epoxy Resin Adduct (6.42 weight percent) Prepared by the Reaction of p-Phenylphenol and Diglycidyl ether of Bisphenol A Plus Rodlike Mesogenic Diisocyanate (8.96 weight percent) and a Polyol Mixture A portion of the reaction product of p-phenylphenol and the diglycidyl ether of bisphenol A (64.16 grams, 6.42 weight percent) prepared using the method of Example 4 (0.05% residual epoxide, 4.9% hydroxyl), the polyol used in Example 19 (230.97 grams, 23.1 weight percent), a glycerine polypropoxylate capped with 18 percent ethylene oxide having a hydroxyl equivalent weight of 1669.6 (346.46 grams), 3,3'-dimethyl-4,4'-diisocyanatodiphenyl (89.61 grams, 8.96 weight percent) and 4,4'-diisocyanatodiphenyl methane (268.83 grams, 26.83 weight percent) are used to prepare a prepolymer as described in Example 19. Titration of a portion of the opaque, white prepolymer reveals the presence of 9.60 percent isocyanate, as compared with a theoretical isocyanate amount of 9.5 percent.

B. Preparation of Polyurethane Elastomer Casting

A portion of the isocyanate terminated prepolymer from A. above (400.0 grams) is used to prepare a polyurethane elastomer casting as described in Example 12. A liquid chain extender solution (250.23 grams) is injected into the reactor. The liquid chain extender solution is prepared by mixing methylenebis(orthochloroaniline) (100.09 grams), block copolymer of polyethylene glycol and 1,2-butylene oxide (899 HEW) (60.06 grams) and glycerine polypropoxylate (1669.6 HEW) (90.08 grams) described in Example 19. Polyurethane elastomer castings are prepared as described in Example 1 including use of a bismuth neodecanoate catalyst and testing of their physical and mechanical properties is done as described therein. The results are reported in Table XI.

TABLE XI

| PROPERTY TESTED* | SAMPLE DESIGNATION Example 24 |
|---|---|
| Spefici Gravity | 1.1508 |
| Shore A Hardness | 89 |
| Bashore Rebound (%) | 36 |
| Die C Tear Strength (lb./in.) | 376 (6.7) |
| Split Tear Strength (lb./in.) | 146 (6.8) |
| Water Absorption - Regular (%) | 5.28 (.14) |
| -Predried (%) | 5.36 (.00) |
| Compression Set, Method B, 25° C./25% | 4.43 |
| Flexural Modulus (psi) | 13,464 (895) |
| Flexural Strength (psi) | (37.5) |
| Tensile Properties: Final Strain (%) | 340 (20.9) |
| Final Stress (psi) | 3329 (203) |
| Modulus (psi): | |
| 50% | 1048 (2) |
| 100% | 1343 (8) |
| 200% | 2032 (14) |
| 300% | 2963 (24) |
| Percent Hard Segment[1] | 22.18 |

*Parenthetical, ( ), values designate the standard deviation.
[1]weight methylenebis(ortho-chloroaniline) + weight diisocyanates(s) reacting with methylenebis(ortho-chloroaniline) divided by total weight.

EXAMPLE 26

Dynamic Mechanical Thermal Analysis of Polyurethane Elastomer Castings

Portions of the polyurethane elastomer castings of Examples 24 and 25 are subjected to dynamic mechanical thermal analysis (DMTA) using the method of Example 23. The results are summarized in Table XII.

EXAMPLE 27

A. Synthesis of an Isocyanate Terminated Prepolymer Containing the Epoxy Resin Adduct (6.15 weight percent) Prepared by the Reaction of p-Phenylphenol and Diglycidyl Ether of Bisphenol A Plus Rodlike Mesogenic Diisocyanate (4.81 weight percent)

A portion of the reaction product of p-phenylphenol and the diglycidyl ether of bisphenol A (55.36 grams, 6.15 weight percent) prepared using the method of Example 4 (0.05% residual epoxide 4.9% hydroxyl), the polyol used in Example 19 (498.20 grams, 55.36 weight percent), 3,3'-dimethyl4,4'-diisocyanatodiphenyl (43.31 grams, 4.81 weight percent) and 4,4'diisocyanatodiphenyl methane (303.14 grams, 33.68 weight percent) are used to prepare a prepolymer as described in Example 19. Titration of a portion of the slightly opaque, light yellow colored prepolymer reveals the presence of 9.59 percent isocyanate, as compared with a theoretical isocyanate amount of 9.5 percent.

B. Preparation of Polyurethane Elastomer Casting

A portion of the isocyanate terminated prepolymer from A. above (400.0 grams) is used to prepare a polyurethane elastomer casting as described in Example 12. A liquid chain extender solution (237.37 grams) is injected into the reactor. The liquid chain extender solution is prepared by mixing methylenebis(orthochloroaniline) (94.95 grams) and block copolymer of polyethylene glycol and 1,2-butylene oxide (899 HEW) (142.42 grams) as described in Example 19. Polyurethane elastomer castings are prepared as described in Example 1 including use of a bismuth neodecanoate catalyst and testing of their physical and mechanical properties is done as described therein. The results are reported in Table XIII.

EXAMPLE 28

A. Synthesis of an Isocyanate Terminated Prepolymer Containing the Epoxy Resin Adduct (12.02 weight percent) Prepared by the Reaction of p-Phenylphenol and Diglycidyl Ether of Bisphenol A Plus Rodlike Mesogenic Diisocyanate A portion of the reaction product of p-phenylphenol and the diglycidyl ether of bisphenol A (120.21 grams, 12.02 weight percent) prepared using the method of Example 4 (0.05% residual epoxide, 4.9% hydroxyl), the polyol used in Example 19. (480.83 grams, 48.08 weight percent), 3,3'- dimethyl-4,4'-diisocyanatodiphenyl (99.74 grams, 9.97 weight percent) and 4,4'-diisocyanatodiphenyl methane (299.22 grams, 29.92 weight percent) are used to prepare a prepolymer as described in Example 19. Titration of a portion of the slightly opaque, light yellow colored prepolymer reveals the presence of 9.57 percent isocyanate, as compared with a theoretical isocyanate amount of 9.5 percent.

TABLE XII

| Sample Designation | Tan Delta Transition (°C.) | Storage Modulus (dynes/cm$^2$ × 10$^9$) | | | | | | | | |
|---|---|---|---|---|---|---|---|---|---|---|
| | | −100° C. | −50° C. | −25° C. | 0° C. | 25° C. | 50° C. | 100° C. | 150° C. | 200° C. |
| Example 24 | −1 | 21.1 | 18.8 | 14.4 | 2.97 | .87 | .46 | .34 | .34 | .19 |
| Example 25 | −10 | 23.7 | 22.5 | 7.60 | 2.61 | 1.12 | .68 | .46 | .37 | .30 |

B. Preparation of Polyurethane Elastomer Casting

A portion of the isocyanate terminated prepolymer from A. above (402.4 grams) is used to prepare a polyurethane elastomer casting as described in Example 12. A liquid chain extender solution (238.41 grams) is injected into the reactor. The liquid chain extender solution is prepared by mixing methylenebis(orthochloroaniline) (95.36 grams) and block copolymer of polyethylene glycol and 1,2-butylene oxide (899 HEW) (143.05 grams) as described in Example 19. Polyurethane elastomer castings are prepared as described in Example 1 including use of a bismuth neodecanoate catalyst and testing of their physical and mechanical properties is done as described therein. The results are reported in Table XIII.

TABLE XIII

| Property Tested* | Sample Designation | |
|---|---|---|
| | Example 27 | Example 28 |
| Specific Gravity | 1.1658 | 1.1735 |
| Shore A Hardness | 84 | 90 |
| Bashore Rebound (%) | 17 | 25 |
| Die C Tear Strength (lb./in.) | 344 [9.2] | 415 [6.2] |
| Split Tear Strength (lb./in.) | 136 [2.8] | 233 [9.4] |
| Water Absorption Regular (%) | 9.40 [.29] | 7.63 [.25] |
| Predried (%) | 10.49 [.08] | 7.65 [.21] |
| Compression Set, Method B, 25° C. | 7.63 | 11.14 |
| Flexural Modulus (psi) | 5384 [186] | 11,373 [269] |
| Flexural Strength (psi) | 204 [5.3] | 426 [5.6] |
| Tensile Properties: Final Strin (%) | 353 [9] | 378 [16] |
| Final Stress (psi) | 4515 [300] | 4383 [225] |
| Modulus (psi): | | |
| 50% | 843 [0] | 1036 [4] |
| 100% | 1105 [0] | 1316 [44] |
| 200% | 1801 [0] | 1950 [47] |
| Percent Hard Segment[1] | 22.05 | 22.08 |

*Bracketed, [ ], values designate the standard deviation.
[1]weight methylenebis(ortho-chloroaniline) + weight diisocyanates(s) reacting with methylenebis(ortho-chloroaniline) divided by total weight.

What is claimed is:

1. An adduct prepared by reacting
   (A) a compound containing at least one epoxy group per molecule, with
   (B) a compound containing at least one epoxide reactive group per molecule selected from the group consisting of phenolic, thiol, secondary amine and carboxyl;
wherein
   (i) when compound (A) is a polyepoxide, compound (B) contains a single epoxide reactive group per molecule;
   (ii) when compound (A) is a monoepoxide it is a monoglycidyl ether and compound (B) contains at least two epoxide reactive groups per molecule;
   (iii) at least one of components (A) and (B) contains a rodlike mesogenic moiety; and
   (iv) components (A) and (B) are employed in amounts which provide an equivalent ratio of epoxide groups to epoxide-reactive groups of from about 1:0.80 to about 1:1.25;
with the proviso that
   (i) said adduct is not an adduct of the diglycidyl ether of 3,3′,5,5′-tetramethylbiphenyl and phenol;
   (ii) when component (B) contains a carboxyl group as the single epoxide reactive group per molecule and the other portion of the molecule is an aliphatic group, it is a saturated aliphatic group; and
   (iii) component (B) is not a compound containing a single epoxide-reactive group represented by the formula $M^1$—Q wherein $M^1$ is an aliphatic or cycloaliphatic group and Q is —OH.

2. The adduct of claim 1 wherein components (A) and (B) are employed in amounts which provide an equivalent ratio of epoxide groups to epoxide-reactive groups of from about 1:0.90 to about 1:1.05.

3. The adduct of claim 1 wherein the rodlike mesogenic moiety is present in the main chain, a side chain, or both a main chain and side chain.

4. The adduct of claim 3 wherein the rodlike mesogenic moiety is biphenyl.

* * * * *